(12) United States Patent
Lyerly et al.

(10) Patent No.: US 8,112,306 B2
(45) Date of Patent: Feb. 7, 2012

(54) SYSTEM AND METHOD FOR FACILITATING TRIGGERS AND WORKFLOWS IN WORKFORCE OPTIMIZATION

(75) Inventors: Thomas Lyerly, Marietta, GA (US); Nick McLean, Duluth, GA (US); Shimon Keren, Sunnyvale, CA (US)

(73) Assignee: Verint Americas, Inc., Roswell, GA (US)

( * ) Notice: Subject to any disclaimer, the term of this patent is extended or adjusted under 35 U.S.C. 154(b) by 842 days.

(21) Appl. No.: 11/479,506

(22) Filed: Jun. 30, 2006

(65) Prior Publication Data
US 2007/0198329 A1     Aug. 23, 2007

Related U.S. Application Data

(63) Continuation-in-part of application No. 11/359,356, filed on Feb. 22, 2006.

(51) Int. Cl.
*G06Q 10/00*     (2006.01)
(52) U.S. Cl. ........................ 705/7.41; 705/7.38
(58) Field of Classification Search .................. 705/7.38, 705/7.42
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |

(Continued)

FOREIGN PATENT DOCUMENTS

CA     2262044     10/1999

(Continued)

OTHER PUBLICATIONS

Blue Pumpkin website (www.bluepumpkin.com, Mar.-May, 2005, accessed by internetarchive.org on May 7, 2009).*

(Continued)

*Primary Examiner* — Lynda Jasmin
*Assistant Examiner* — George H Walker
(74) *Attorney, Agent, or Firm* — McKeon, Meunier Carlin & Curfman

(57) ABSTRACT

The systems and methods described herein provide a notification engine that facilitates integration of solutions for performing workforce management, quality monitoring, e-learning, performance management, and analytics functionality. The notification engine facilitates combining quality monitoring/call recording with performance management and e-learning functionality as a unified integrated solution. The combination can be delivered through a single platform and enables users to gain more insight and make smarter decisions faster about sales, service, and overall operations. This takes customer center tools beyond the traditional "suite" approach to a true single workforce optimization platform.

12 Claims, 21 Drawing Sheets

U.S. PATENT DOCUMENTS

| | | | |
|---|---|---|---|
| 5,311,422 | A | 5/1994 | Loftin et al. |
| 5,315,711 | A | 5/1994 | Barone et al. |
| 5,317,628 | A | 5/1994 | Misholi et al. |
| 5,347,306 | A | 9/1994 | Nitta |
| 5,388,252 | A | 2/1995 | Dreste et al. |
| 5,396,371 | A | 3/1995 | Henits et al. |
| 5,432,715 | A | 7/1995 | Shigematsu et al. |
| 5,465,286 | A | 11/1995 | Clare et al. |
| 5,475,625 | A | 12/1995 | Glaschick |
| 5,485,569 | A | 1/1996 | Goldman et al. |
| 5,491,780 | A | 2/1996 | Fyles et al. |
| 5,499,291 | A | 3/1996 | Kepley |
| 5,535,256 | A | 7/1996 | Maloney et al. |
| 5,572,652 | A | 11/1996 | Robusto et al. |
| 5,577,112 | A | 11/1996 | Cambray et al. |
| 5,590,171 | A | 12/1996 | Howe et al. |
| 5,597,312 | A | 1/1997 | Bloom et al. |
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,044,355 | A | 3/2000 | Crockett et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Puram et al. |
| 6,301,462 | B1 | 10/2001 | Freeman et al. |
| 6,301,573 | B1 | 10/2001 | McIlwaine et al. |
| 6,324,282 | B1 | 11/2001 | McIlwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,574 | B1 | 4/2002 | House et al. |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIlwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazar |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,628,777 | B1 * | 9/2003 | McIllwaine et al. ...... 379/265.01 |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,766,012 | B1 | 7/2004 | Crossley |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,959,078 | B1 * | 10/2005 | Eilbacher et al. ........ 379/265.03 |
| 6,965,886 | B2 | 11/2005 | Govrin et al. |
| 6,970,829 | B1 * | 11/2005 | Leamon ...... 705/7.14 |
| 7,092,509 | B1 * | 8/2006 | Mears et al. ...... 379/266.01 |
| 7,158,628 | B2 | 1/2007 | McConnell et al. |
| 7,346,531 | B2 | 3/2008 | Jacobs |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0046130 | A1 | 3/2003 | Golightly et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0039628 | A1 | 2/2004 | Thompson et al. |
| 2004/0100507 | A1 | 5/2004 | Hayner et al. |
| 2004/0165717 | A1 | 8/2004 | McIlwaine et al. |
| 2004/0249650 | A1 * | 12/2004 | Freedman et al. ...... 705/1 |
| 2005/0004828 | A1 | 1/2005 | deSilva et al. |
| 2005/0069119 | A1 | 3/2005 | Erhart et al. |
| 2005/0135609 | A1 | 6/2005 | Lee et al. |
| 2005/0159994 | A1 | 7/2005 | Huddleston et al. |
| 2006/0062376 | A1 * | 3/2006 | Pickford ...... 379/265.12 |

| | | | |
|---|---|---|---|
| 2006/0089837 A1* | 4/2006 | Adar et al. | 705/1 |
| 2006/0239440 A1 | 10/2006 | Shaffer et al. | |
| 2006/0265089 A1* | 11/2006 | Conway et al. | 700/94 |
| 2006/0265090 A1* | 11/2006 | Conway et al. | 700/94 |

FOREIGN PATENT DOCUMENTS

| | | | |
|---|---|---|---|
| EP | 0453128 | A2 | 10/1991 |
| EP | 0773687 | A2 | 5/1997 |
| EP | 0989720 | | 3/2000 |
| GB | 2369263 | | 5/2002 |
| WO | WO 98/43380 | | 11/1998 |
| WO | WO 00/16207 | | 3/2000 |
| WO | 2004090770 | A1 | 10/2004 |

OTHER PUBLICATIONS

Blue Pumpkin Advisor Enterprise ("Blue Pumpkin Advisor Enterprise product brief," Blue Pumpkin Software, Inc., Apr. 5, 2004 PN PB006b).*

Blue Pumpkin Activity Manager (product brief, Blue Pumpkin Software, Inc., Apr. 5, 2004 PN PB005b).*

TOTALVIEW® WebStation Guide, Release 3.7, Document No. 1-602-660, IEX Corporation Jun. 2004).*

Quiggins et al ("A New approach to Contact Center Optimization," IEX Corporation, Jun. 21, 2004).*

DeHaan, Peter ("Workforce Management Software" Connections Magazine, Nov. 2004).*

Joel Fleischer ("Work in Progress," Call Center Magazine, Apr. 2004, vol. 17, Iss. 4).*

Gans et al ("Telephone Call Centers: Tutorial, Review, and Research Prospects," Manufacturing & Service Operations Management, vol. 5, No. 2, Spring, 2003, pp. 79-141, 1523-4614/03/0502/0079, 1526-5498 electronic ISSN).

Stearns, Nathan, ("Applying Inbound Techniques to Outbound in Workforce Management. Customer Inter@ction Solutions"), Oct. 2005, 24(4), 52-55. Retrieved May 4, 1009, from ABI/INFORM Global database. (Document ID: 923689061).

Koole, Ger, Mandelbaum, Avishai, "Queueing Models of Call Centers: An Introduction," Annals of Operations Research, vol. 113, pp. 41-59, Jul. 2002, ISSN 0254-5330 (Print) 1572-9338 (Online).

Definitions of and Synonyms for "Experience" downloaded from http://www.merriam-webster.com/dictionary/experience, http://www.oxforddictionaries.com/definition/experience?view=uk and http://thesaurus.com/browse/experience on Jan. 28, 2011.

* cited by examiner

| NOTIFICATION SETUP SCREEN 1905 | |
|---|---|
| ADDITIONAL SELECTOR CONTROLS: DATE, TIME, VIEW, FILTER 1925 | |
| WORKING PANE 1930<br><br>OFTEN A LIST IS INCLUDED | RECIPIENTS 1920<br><br>MAY INCLUDE ORGS, EMPLOYEES, REPORTS OR OTHER ENTITIES |
| BUTTONS 1935: ADD, EDIT, DELETE ... | |

FIG. 19

SYSTEM AND METHOD FOR FACILITATING TRIGGERS AND WORKFLOWS IN WORKFORCE OPTIMIZATION

CROSS REFERENCE TO RELATED APPLICATION

The present application is a continuation-in-part of copending U.S. utility application entitled, "Systems and Methods for Workforce Optimization", having Ser. No. 11/359,356, filed Feb. 22, 2006, which is entirely incorporated herein by reference.

FIELD OF THE DISCLOSURE

The present disclosure relates to triggering within workforce optimization of customer centers.

BACKGROUND

The business of a call center, also known as a customer center, is to provide rapid and efficient interaction between agents and customers (or prospective customers). Existing solutions require the purchase of multiple hardware and software components, typically from different vendors, to achieve the business goals of the customer center. The use of separate systems of components leads to a variety of problems. For instance, each system typically has its own method of configuration and its own user interface. Thus, exchanging data between the systems requires additional work by someone at the customer center.

Furthermore, customer centers are continually tasked with striking a balance between service quality, efficiency, effectiveness, revenue generation, cost cutting, and profitability. As a result, today's customer center agents are charged with mastering multiple data sources and systems, delivering consistent service across customer touch points, up-selling, cross-selling, and saving at-risk customers, while winning new ones.

Additionally, more and more layers of complexity resulting from regulations and standards add further to the challenges of operating a customer center. For example, federal regulations like Sarbanes-Oxley or HIPAA, or business rules such as product return policies, are becoming increasingly challenging to track and monitor, particularly the effectiveness agents' in meeting compliance objectives.

Thus, there remains a need for an automation technology to drive, for example and among others, adherence, compliance, alerts, triggers, and workflows.

SUMMARY

Systems and methods are disclosed for a notification process for optimizing operations at, for example, a customer center. In the preferred embodiment, the process automatically logs, alerts, triggers and/or enforces service level compliance rules and regulations across a plurality of agents and/or workforce optimization applications. In one embodiment, the process comprising: defining customer center business goals; planning a first campaign to implement the goals; scheduling and deploying a workforce in accordance with the campaign to produce a plurality of agent-customer interactions; measuring performance of an agent on at least a portion of the agent-customer interactions to produce a set of quality metrics for the agent; analyzing the quality metrics to produce a rating of the measured interactions; combining at least a portion of quality metrics to produce performance indicators; using the performance indicators to plan a second campaign or another iteration of the first campaign; monitoring the above steps to determine whether the steps were achieved according to the business rules; and responsive to any one of the above steps having not achieved its business rules, provide to a user a notification message indicative thereof. Succinctly, agent activity can be monitored and supervisors can be notified when, for examples, regulatory procedures have not been followed, or when thresholds have been exceeded, or when business rule(s) triggers pre-determined events.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 19 is an exemplary display diagram that illustrates a setup of notification messages to a user.

DETAILED DESCRIPTION

Figure 1:
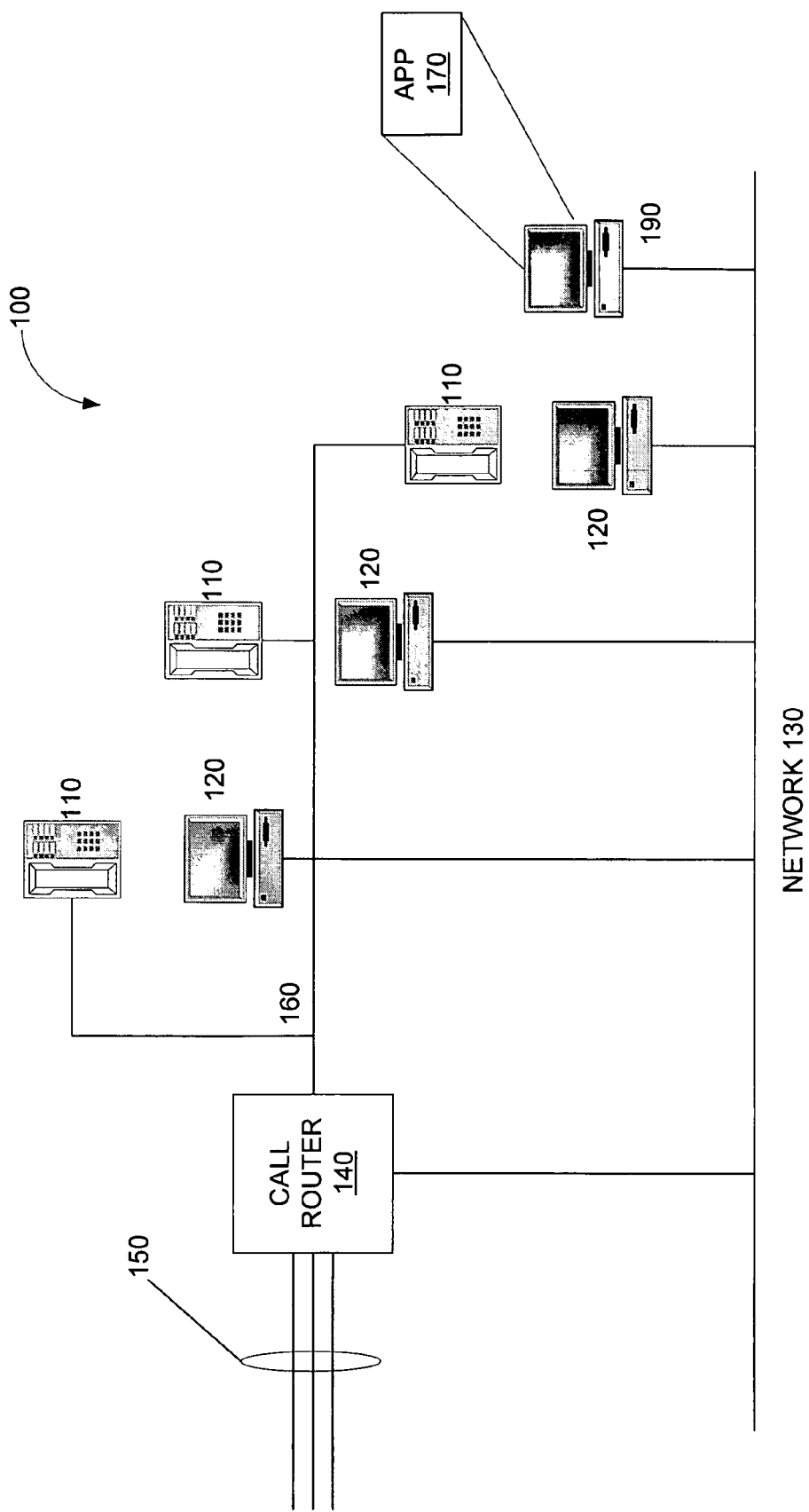
FIG. 1 is a block diagram of a customer center environment.

The systems and methods described herein provide a notification engine that facilitates integration of solutions for performing workforce management, quality monitoring, e-learning, performance management, and analytics functionality. The notification engine facilitates combining quality monitoring/call recording with performance management and e-learning functionality as a unified integrated solution. For example, real-time alerts can be sent to supervisors if service agents are exceeding their authorized discounts for goods or services, or if they have reached a certain step in the process through an inappropriate sequence of screens or keystrokes, or pre-determined rules are satisfied. Customer center includes, but is not limited to, outsourced customer centers, outsourced customer relationship management, customer relationship management, voice of the customer, customer interaction, customer center, multi-media customer center, remote office, distributed enterprise, work-at-home agents, remote agents, branch office, back office, performance optimization, workforce optimization, hosted customer centers, and speech analytics, for example.

The notification engine can affect all areas of the unified integrated solution because the notification engine introduces a comprehensive means of alerting and notifying agents or supervisors of event triggers. In general, the notification engine automatically looks for problems (or thresholds) that occur throughout the unified integrated solution and notifies users of the problems or if certain criteria are met. In some instances, the notification engine provides solutions to the users to resolve the problems. The notification engine creates a notification framework that all applications can utilize as an extension to their current functionality. The notification engine can send intrusive notifications directly to an agent's desktop that is deployed in the unified integrated solution.

The notification engine facilitates the converging of five customer center technology segments that work together in support of a greater customer service strategy. In short, the integrated workforce optimization platforms disclosed herein integrate: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leverage best practice customer interactions and deliver learning to support development; and/or (5) Analytics—deliver insights from customer interactions to drive business performance. The notification engine automatically detects and notifies users to drive business performance in the five customer center technology segments. The notification engine enables the five segments to become part of an interwoven and interoperable solution, enabling customer centers to transition from reactive cost centers to proactive, information-rich departments that deliver strategic value to the organization.

Further, the integrated workforce optimization platforms disclosed herein provide closed-loop systems for continuous performance improvement, enabling customer centers to: establish realistic forecasts and performance goals; schedule and deploy the right number of staff with the appropriate skills; capture customer interactions in their entirety by recording all calls, or recording based on business rules, or on-demand, or randomly; measure performance to identify execution issues and excellence; analyze customer interactions to investigate opportunities for optimizing use of people, processes and technologies; take action by delivering targeted training or re-engineering processes; and/or refine forecasts and performance goals based on the collected data. The operations of the closed-loop systems are monitored by the notification engine to ensure that the closed-loop systems accomplish their business rules, goals and specification.

One embodiment of the integrated process and system disclosed herein begins with planning and establishing goals—from both an enterprise and center perspective—to ensure alignment and objectives that complement and support one another. Next comes forecasting and scheduling of the workforce to ensure optimum service levels. Then recording and measuring performance are utilized, leveraging quality monitoring/call recording to assess service quality and the customer experience.

Next, the process/system analyzes and identifies opportunities and correlates them with customer center or organization's KPIs and scorecards. Then, e-learning and company-specific "best practices" (documented through captured customer interactions) make it possible to address skill and knowledge gaps efficiently and effectively—as well as quickly communicate policy or procedural changes across the center—enabling the customer center to achieve success in whatever terms it chooses to define. Rather than arbitrarily sending e-learning training segments and hoping agents use them, customer centers can use advanced workforce management forecasting and scheduling to select the best time to administer training (which is proven to be more effective than classroom or group learning) as well as freeing the supervisors from working one-on-one with agents.

Quality monitoring scores, including insights from analytics and/or analytical analysis of structured, unstructured, or aggregated data, can next be fed into a workforce management to produce staffing models that prevent companies from unknowingly scheduling one shift with all the top performers, for example. As a result, some embodiments of the workforce management component of the process/system of the present disclosure can provide a higher level of consistent service across shifts.

As can be seen, while each technology segment delivers value, integration of the segments delivers greater impact than the sum of their individual parts. Utilizing them separately limits the customer center's potential to become a strategic business asset. The notification engine facilitates the integration of the segments by monitoring and notifying the users of completed/uncompleted goals, problems and potential problems within the segments. Notification messages to the users provide information that enables the customer centers to improve the overall performance of the customer centers as well as agents' and supervisors' performances.

The integrated systems for workforce optimization disclosed herein potentially solve many deficiencies in today's maturing customer center industry. For instance, at an operational level, centers are focused on optimizing customer sales/service representative (CSR) performance. In the process, centers may be working under constraints, such as cost control and infrastructures that provide only bare essentials. They may also face the challenge of matching demand with resources, retaining effective agents, prioritizing coaching/ training, and delivering consistent customer experiences. Leveraging an integrated system and its components, such as forecasting and scheduling, voice/screen capture/recording, evaluations and best practice training, enables them to focus on reducing risk, decreasing average handle time, improving quality scores, driving down average time to answer, ensuring adherence and managing occupancy.

At a more advanced level, customer centers are focused on optimizing customer center performance. They face the challenge of balancing productivity with quality, increasing center-driven revenue, standardizing service across touch points, and growing transaction complexities. Customer centers are examining such metrics as first call resolution, shrinkage, up-selling and cross-selling, and customer satisfaction as driven through the customer center. As disclosed herein, the forecasting and scheduling, adherence, business rules-driven recording, lesson management, agent/organizational scorecard functionality and notification engine—for example—unite customer center experiences, provide flexible scheduling, and promote the initiation of a performance improvement culture.

The subject matter disclosed herein is related to the subject matter disclosed in several pending U.S. patent applications. One is entitled "Systems and Methods for Managing Recorders from a Central Point of Administration," filed Feb. 22, 2006, assigned Ser. No. 11/359,325, and entirely incorporated by reference herein. The subject matter of the 1180 application is centralized administration of voice, video, and data recorders, and enabling role-based access control of recorders which do not have role-based security concepts.

Another is "Systems and Methods for Scheduling Call Center Agents Using Quality Data and Correlation-Based Discovery," filed Feb. 22, 2006, assigned Ser. No. 11/359,909, and entirely incorporated by reference herein.

Another is "Systems and Methods for Scheduling Call Center Agents Using Quality Data and Correlation-Based Discovery," filed Feb. 22, 2006, assigned Ser. No. 11/359,731, and entirely incorporated by reference herein.

Another is "System and Method for Integrating Learning Systems and Scorecards Systems", filed Feb. 22, 2006, assigned Ser. No. 11/359,359, and entirely incorporated by reference herein.

Another is "System and Method for Integrating Learning Systems and Workforce Management Systems", filed Feb. 22, 2006, assigned Ser. No. 11,359,194, and entirely incorporated by reference herein.

Another is U.S. application Ser. No. 10/136,705, entitled "Method and System for Presenting Events Associated with Recorded Data Exchanged between a Server and a User," and entirely incorporated by reference herein. The subject matter of the '705 application includes capturing and graphically displaying events that occur during an interaction between a customer and an agent. A reviewer is presented with a summarized voice interaction session, in the form of a call timeline, including a list of event identifiers. The reviewer selects one of the event identifiers in the timeline, and the interaction session, starting with the selected event, is presented to the user. The user could choose to start listening to the exchange at an event by selecting the event.

Another is U.S. application Ser. No. 10/137,480, entitled "Method and System for Selectively Dedicating Resources for Recording Data Exchanged between Entities Attached to a Network," filed on Apr. 30, 2002, and entirely incorporated by reference herein. The subject matter of the '480 application includes determining whether to use an active tap or a passive tap to record data passing through a particular node based upon an objective for recording as noted by predefined business rules.

Another is U.S. application Ser. No. 10/136,735, entitled "Methods and Systems for Categorizing and Cataloguing Recorded Interactions," filed on Apr. 30, 2002, and entirely incorporated by reference herein. The subject matter of the '735 application includes categorizing data upon storing the captured data. The categories are based upon predefined business rules for storing captured data.

Another is U.S. application Ser. No. 10/061,469, entitled "Method, Apparatus, and System for Capturing Data Exchanged between a Server and a User," filed on Jan. 21, 2002, and entirely incorporated by reference herein. The subject matter of the '469 application includes capture of exchange data by a capture module that operates independently from the server and the user.

Another is U.S. application Ser. No. 10/061,489, entitled "Method, Apparatus, and System for Processing Data Captured during Exchanges between a Server and a User," filed on Jan. 31, 2002, and entirely incorporated by reference herein. The subject matter of the '489 application includes selective recordation of captured data based upon whether the data satisfies predetermined business rules.

Another is U.S. application Ser. No. 10/061,491, entitled "Method, Apparatus, and System for Replaying Data Selected from Among Data Captured During Exchanges Between a Server and a User," filed on Jan. 21, 2002, and entirely incorporated by reference herein. The subject matter of the '491 application includes replaying data captured during a session, wherein search criteria are based upon business rules.

The following is a list of other U.S. utility applications which include related subject matter, each of which is incorporated by reference: U.S. utility application, entitled, "Method and Apparatus for Long-Range Planning," having Ser. No. 09/899,895, filed Oct. 3, 2002; U.S. utility application entitled, "Interface System and Method of Building Rules and Constraints For a Resource Scheduling System," having Ser. No. 09/680,131, filed Oct. 2, 2000; U.S. Utility Application entitled, "System and Method for Complex Schedule Generation," having Ser. No. 09/825,589, filed Apr. 3, 2001; U.S. utility application entitled, "Method and Apparatus for Long-Range Planning," having Ser. No. 09/899,895, filed Jul. 5, 2001; U.S. utility application entitled, "Method and Apparatus for Multi-Contact Scheduling," having Ser. No. 11/037,604, filed Jan. 18, 2005; and U.S. Utility application entitled, "Method and Apparatus for Concurrent Error Identification in Resource Scheduling," having Ser. No. 11/237,456, filed Sep. 9, 2005.

FIG. 1 is a block diagram of a customer center environment 100. The customer center 100 is staffed by agents who handle incoming and/or outgoing contacts. Although the traditional and most common form of contact is by phone, other types of contacts are becoming more common (e.g., text chat, web collaboration, email, and fax). An agent workspace includes an agent phone 110 and a workstation computer 120. A network 130 connects one or more of the workstations 120.

A call router 140 distributes incoming contacts to available agents. When the contacts are made by traditional phone lines, the call router 140 operates by connecting outside trunk lines 150 to agent trunk lines 160. In this environment, the call router 140 may be implemented by an automatic call distributor (ACD), which queues calls until a suitable agent is available. Other types of contacts, such as Voice Over Internet Protocol (VoIP) calls and computer-based contacts (e.g., chat, email) are routed over one or more data networks. These contacts are distributed over network 130 to one of the agent workstations 120.

During a customer contact, the agent interacts with one or more applications running on the workstation 120. Example workstation applications give the agent access to customer records, product information, ordering status, and transaction history, for example.

The business purpose of a customer center is to provide rapid and efficient interaction between agents and customers. To achieve this purpose, a customer center follows a business process having states, in that one state affects subsequent states. An example of the states is described in relation to FIG. 2.

In a conventional customer center business process, there is a relatively high degree of separation between states. In contrast, in the integrated customer center business process 200 (FIG. 2) described here, multiple states are connected into a loop, with each state of the process feeding input into another state down the line.

Figure 2:
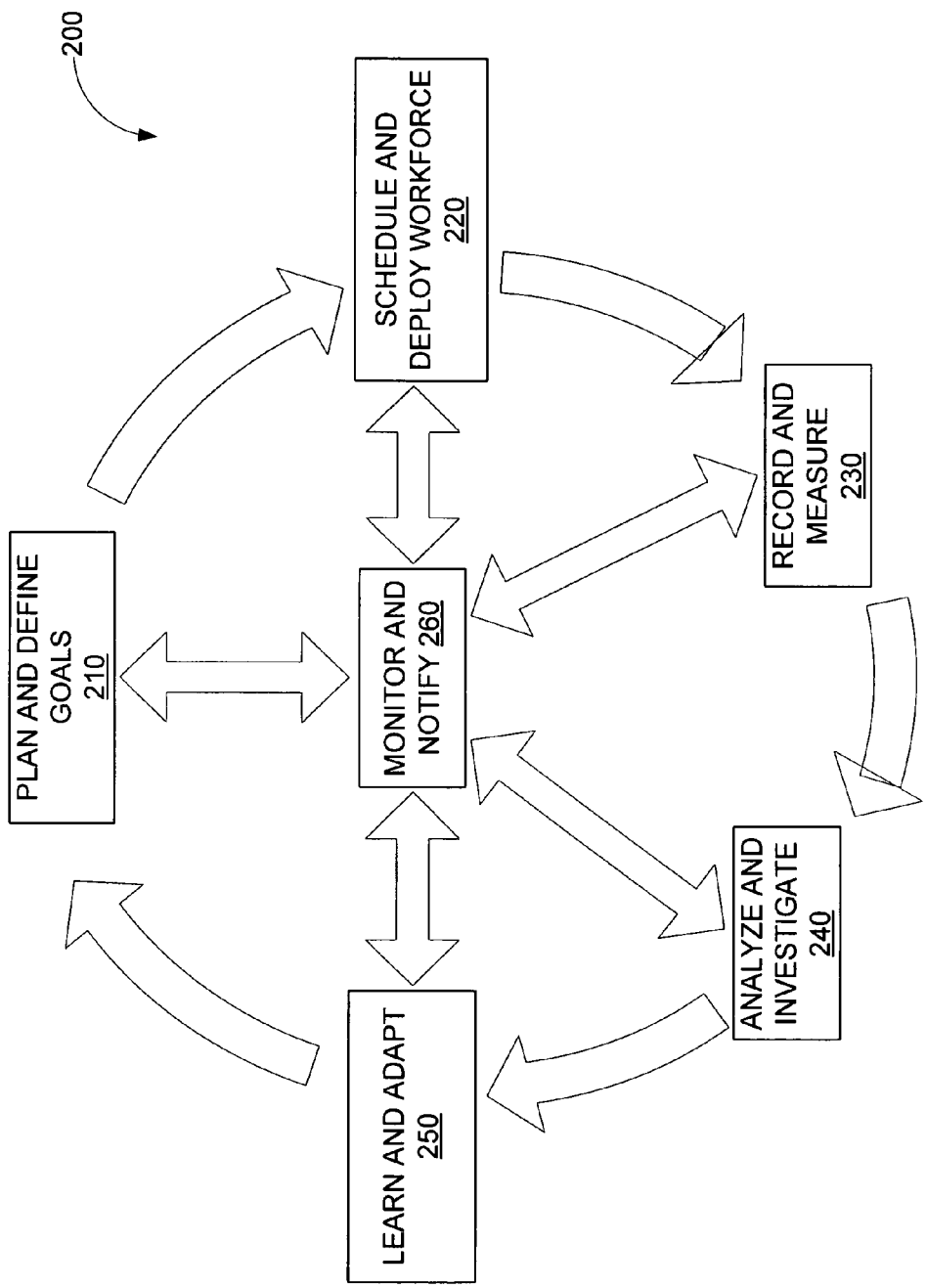
FIG. 2 is a diagram of an embodiment of an integrated process for optimizing operations at a customer center.

FIG. 2 is a diagram of an embodiment of the integrated process for optimizing operations at a customer center 200, in which several interfaced organizations are combined as a single integrated operational process and/or platform. In the first state 210, the business goals of the customer center are defined. Goals are defined in terms of metrics that describe how the customer center is expected to perform. Some metrics relate to expected revenue, such as revenue/hour or revenue/agent. Other metrics relate to service level, such as time-to-answer and rate of first-call resolution. Persons familiar with customer center operations should understand these and many other business goals and metrics.

The first state 210 may also include campaign planning. Profiles for campaigns are defined, for example by inbound or outbound; how many contacts are expected; date and duration of the campaign; and what sorts of agent skills are needed.

Information about the goals and campaign(s) produced by the first state 210 is provided to the second state 220 and sixth state 260. The sixth state 260 receives the information about the goals and campaign(s) from the first state 210 and track whether the goals and campaign(s) are achieved. The sixth state 260 further notifies users of the first state 210 that the goals and campaign(s) were achieved or not.

In the second state 220, a workforce of agents is scheduled to staff the campaign(s). In determining the number of agents scheduled for a campaign, the goals/metrics and campaign characteristics from the first state 210 are considered. The schedule is also used as input of a workload forecast, which predicts contact volume during each interval of the campaign, based on historical data. Using this schedule, the customer center manager deploys the appropriate number and mix of agents during the campaign times.

The sixth state 260 receives the information about the number of agents scheduled for the campaign from the second state 220 and tracks whether the number of agents scheduled for the campaign is achieved. The sixth state 260 further notifies users of the second state 220 that the number of agents scheduled for the campaign was achieved or not.

The output of the second state 220 is the customer-agent interactions that occur during a campaign. The third state 230 measures or assesses the interactions in various ways. One typical assessment ("adherence") measures how well an agent complied with customer center policies (e.g., call duration). In the third state 230, at least a portion of the interactions are recorded and then examined. This examination produces a variety of quality metrics that assess an agent's skills in various categories (product knowledge, selling, listening, etc.)

The sixth state 260 receives the information about various measurements, assessments, recordings, and examinations from the third state 230 and determines whether the various assessments indicated that the agent complied with the customer center policies. The sixth state 260 further notifies users of the third state 230 that the customer center policies were achieved or not based on the various assessments.

The various assessments are provided as input to the fourth state (240). In this state, these inputs are analyzed in various ways. The analysis may rate interactions on a "good" to "bad" scale, considering the customer point of view, the business point-of-view, or both. For example, a contact that resulted in a sale would be an indicator of a "good" interaction while a contact that exceeded average duration would be an indicator of a "bad" interaction.

Once "bad" interactions are identified, an attempt is made to determine a root cause. In some cases, the root cause may lie with an agent (e.g., weak product skills). In other cases, the cause may be in the customer center infrastructure or operations (e.g., customer database is slow). The cause might also be rooted in a business process of the enterprise that is sponsoring the campaign. For example, the billing process used by the enterprise, or the process by which the enterprise dispatches field service units could be the cause.

The sixth state 260 receives the information about the analysis of the interaction from the fourth state 240 and determines whether the analysis of the interaction is "bad" or "good". The sixth state 260 further notifies users of the fourth state 240 that the analysis of the interaction was "bad" or "good". The sixth state 260 can further provide the user the root cause of the "bad" interactions.

The fifth state 250 uses the analysis produced by the fourth state 230 to adapt and change operations accordingly. Agent skills can be improved by training in the deficient areas. The information may be used to change an aspect of customer center operations, or to make a recommendation to the sponsoring enterprise for it to change its processes or operations. The results of the analysis, as well as the raw metrics used as input to the analysis, are combined into data sets ("scorecards") that allow the customer center operators to determine whether or not the business goals are met and whether the metrics show progress toward the goals or away from the goal ("trending"). These data sets are provided as input to the first state 210, which closes the feedback loop of the integrated customer center business process 200.

The fifth state 250 can provide the scorecards to the agents and customer center operators. The fifth state 250 can notify the agents that changes have been made to a particular customer center operations because the customer center did not meet business goals or are not progressing toward the goals. In general, the sixth state 260 obtains information from the five states 210, 220, 230, 240, 250 and monitors whether the states accomplished their intended purposes. If the five states 210, 220, 230, 240, 250 provide information that they did not accomplish their intended purposes, a user is notified and can be provided with solutions that can help the user to accomplish the intended purposes.

Figure 3:
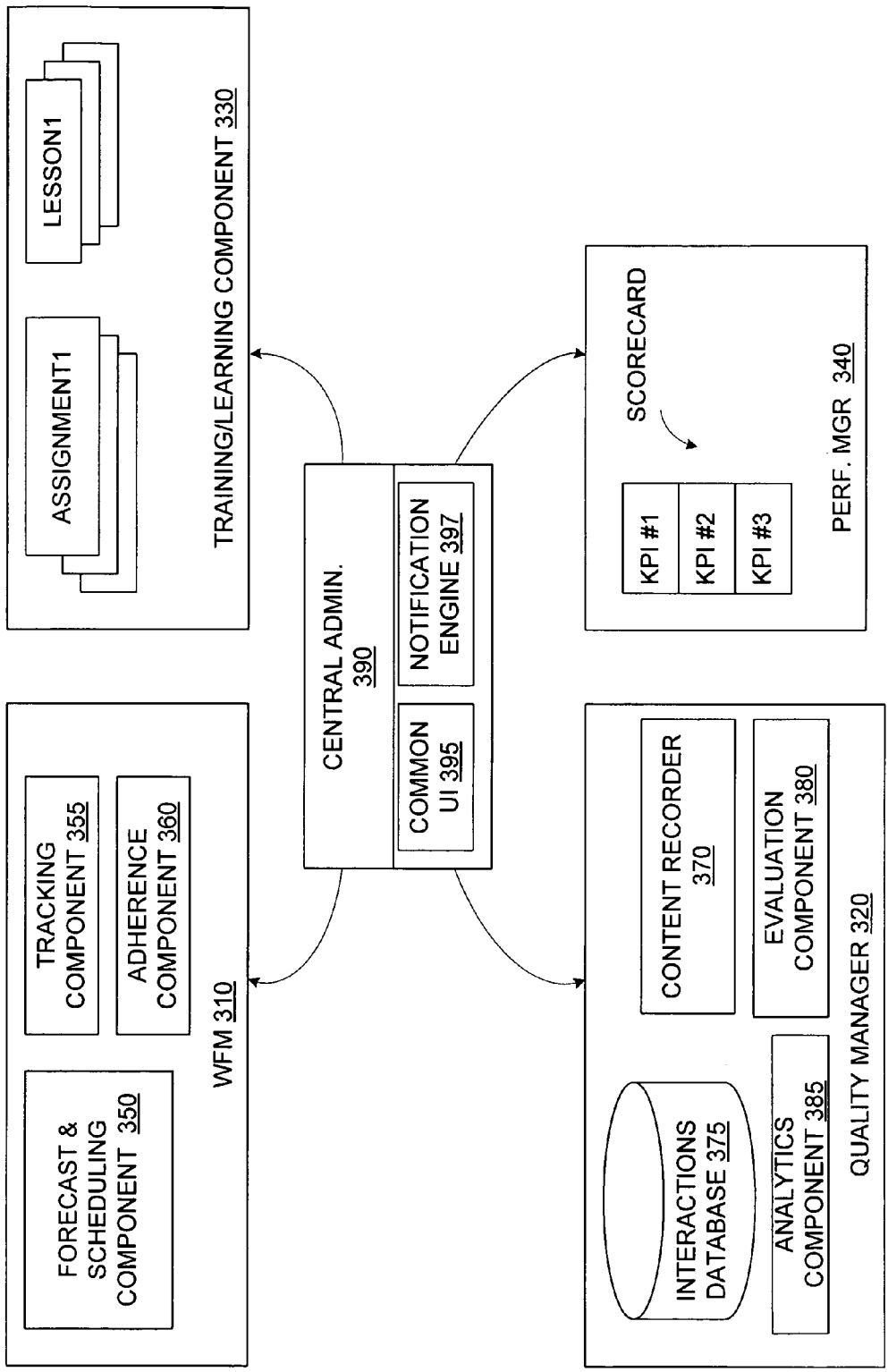
FIG. 3 is a high-level view of components in an embodiment of an integrated customer center system that includes a notification engine.

FIG. 3 is a high-level view of components in an embodiment of an integrated customer center system 300. The integrated system 300 includes two or more of the following components: a work force manager (WFM) 310; a quality monitoring component 320; a learning component 330; and a performance management component 340. These components 310, 320, 330, 340 cooperate to implement the integrated customer center business process 200 as described earlier.

As will be described, combining agent quality metrics from the quality monitor 320 (e.g., synchronous such as voice, asynchronous such as e-mail or chat) with WFM 320 (e.g., agent planning, scheduling) can provide insight that customer center supervisors can use to confirm the value provided by agents to the business as a whole.

The WFM 310 performs many functions related to the agent workforce. For example, WFM 310 can: schedule single, multiple, or virtual customer centers across multiple time zones; accommodate a dedicated, blended, or task-switching environment; schedule meetings or training without impact on service levels; allow agents to bid for shifts and provide input into their schedules; automate compliance with government and union regulations; create centralized forecasts and schedules with a single point of control over the entire network, or decentralized schedules that allow for decision-making at individual sites; schedule based on skill priorities that align with the customer center's routing strategy; and create and schedule teams as a unit to support training and accommodate employee preferences.

The functionality of the WFM 310 is typically divided among several applications, executables, processes, or services. A forecast and scheduling component 350 calculates staffing levels and agent schedules based on historical interaction (contact) patterns. A tracking component 355 provides a customer center supervisor or manager with information about agent activities and agent-customer interactions, both historical and real-time. An adherence component 360 supplies the supervisor with information on how well each agent complies with call center policies. For example, once schedules are created, the customer center should ensure that agents follow the schedules.

Most preferably, the adherence component 360 provides a real-time view of every activity across each channel in the customer center, including those in the front and back office, so supervisors/customer centers can see how their staff spends its time. In an enhancement, alerts can be set to notify supervisors when agents are out-of-adherence and exception management can help ensure agents are correctly recognized for work they have performed.

The quality monitor 320 includes a content recorder 370 for recording agent-customer interactions. The content recorder 370 can be configured to capture all interactions, or a selected set of interactions based on user-defined business rules.

The content recorder 370 can capture voice and data interactions from both traditional and IP telephony environments and can handle high-volume recording for compliance and sales verification. The content recorder 370 can also record all voice transactions across multiple sites, or randomly capture a subset of transactions that may be of particular interest, as well as record contacts on-demand. Using the content recorder 370 a user can record all contacts or establish advanced business rules to capture only those transactions of particular interest. User-defined business rules can trigger the recordings, initiate enterprise collaboration by notifying individuals or groups of the captured contacts and emerging trends, and allow users to assign attributes or "tags" to the contacts for quick identification. All data related to a customer interaction—including navigation of automated systems, agent keystrokes and desktop activities can be stored automatically in folders for search and retrieval. Different users in an enterprise can share and review transactions, as well as hear customer feedback first-hand.

The quality manager 320 stores the interactions in an interactions database 375, which may include descriptive information as well as recorded content. Customer center personnel play back some of the interactions and use an evaluation component 380 to score the agent in various categories (product knowledge, selling, listening, etc.)

Furthermore, customer center supervisors and quality analysts can then tap into these recorded interactions to review, evaluate, and score agent performance. An analytics component 385 can analyze interactions in various ways, including the use of speech analytics. Examples of analysis include categorizing calls based on content, analyzing a call against an expected call pattern and reporting exceptions to the pattern, and providing a visualization layer for recorded interactions that displays other data attributes such as agent activities coincident with call events.

The learning component 330 allows a customer center manager to develop training lessons for agents and assign lessons to agents. The learning component 330 provides automated training processes by identifying, scheduling, and delivering online learning directly to agent desktops. The lesson content can include recorded interactions, which can be used to create a library of best practices for training agents and other personnel. Using actual interactions, a customer center can develop E-learning content specific to the organization. In an enhancement, these training lessons can include assessments to help track and measure agent performance, skill acquisition, and knowledge retention.

The learning component 330 can also deliver targeted learning sessions over a network, using e-mail, or a hyperlink to a Web site, or directly to the agent desktop. Supervisors can select the appropriate training sessions from a library of courseware or create sessions themselves using a contact editing feature. Then supervisors can assign course material and monitor completion automatically.

The performance manager 340 displays key performance indicators (KPIs), which can be predefined on a scorecard. The scorecard, which can be role-appropriate, provides a statistical measure of how well an agent or group of agents is performing (against their goals). The KPI metrics are derived from quality evaluations and/or WFM call routing data.

A centralized administration component 390 consolidates agent administration across the various components into a single point of entry, and provides a single logon to all components for agents and administrators. The administration component 390 may also include a centralized reporting component, even across multiple sites. A common user interface 395 reduces training time on the various system components.

A notification engine 397 monitors, but is not limited to, the WFM 310, quality manager 320, learning component 330 training and performance manager 340, for example, to determine whether each component of the integrated customer center system 300 performs its business rules or goals. If any of the business rules are not met, the notification engine 397 notifies a user of the respective components. The notification engine 397 can also provide instructions to the user on how each component can meet their business rules or goals. If the business rules are achieved responsive to the instructions provided to the user, the notification engine 397 notifies the user that the business rules have been achieved. The notification engine 397 can be deployed within a centralized administration component 390, within a company premises, distributed across multiple geographic locations, and/or embedded into a network as a service on a network infrastructure.

Users of a customer center should be able to schedule and deliver notification features through an application specific interface. Recipients can receive notification messages through their email client for email notifications or through a pop-up or text message for active notifications. The notification engine can be accessed through links from any components of the integrated customer center system. Interfaces can be developed in any applications of the integrated customer center system that allows the users to select an agent for notifications either programmatically or manually.

An integrated customer center system such as system 300 allows customer center analysts to quickly access the right information. Such an integrated system allows valuable and previously undiscovered information to be uncovered. This new level of visibility into customer center operations should allow personnel to make better decisions faster.

Figure 4:
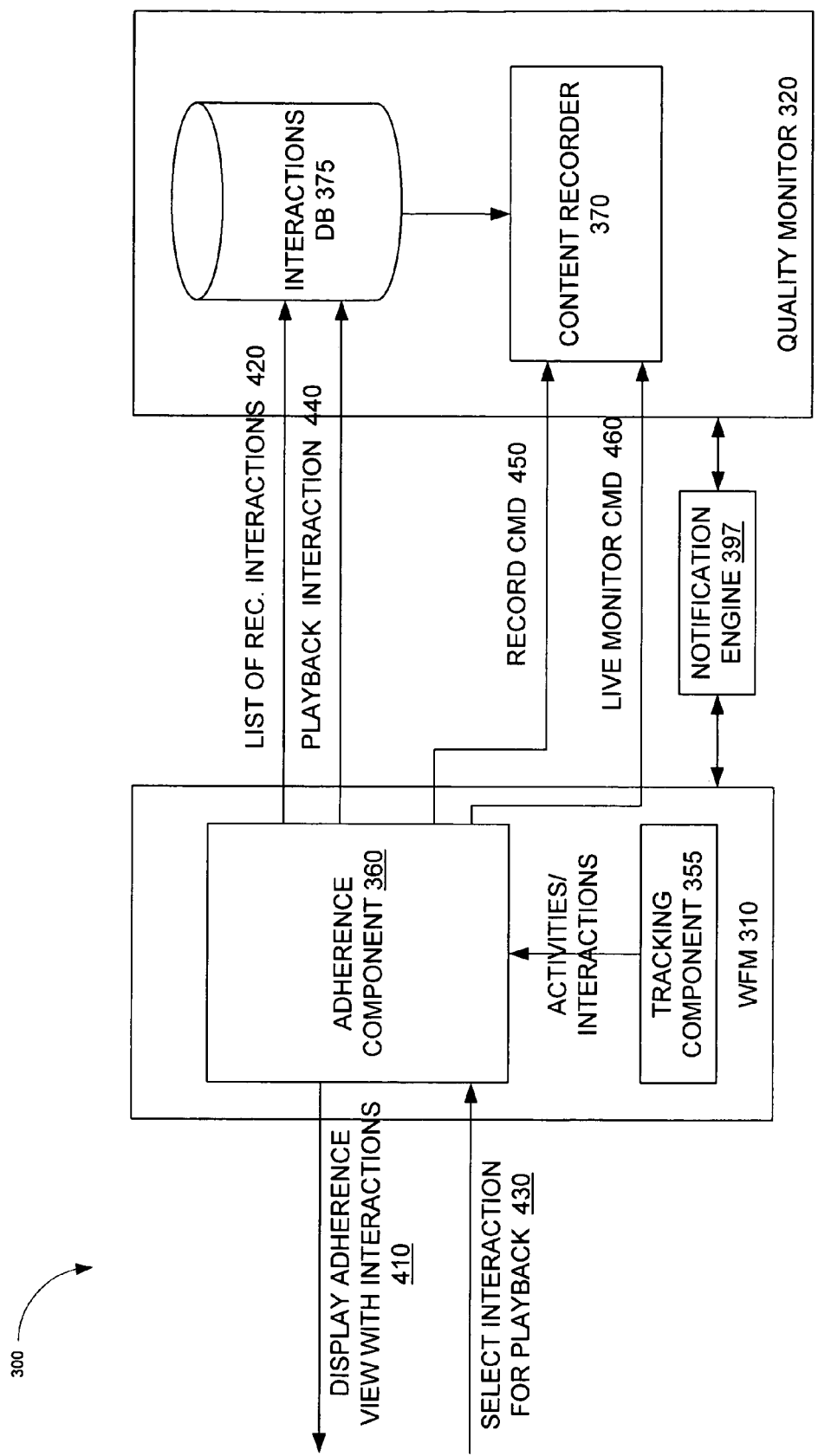
FIG. 4 shows a point of integration between a work force manager (WFM) and a quality monitor, such as shown in FIG. 3.

FIG. 4 shows a point of integration between two components of the integrated customer center system 300, the WFM 310 and the quality monitor 320. Conventional call center systems provide an "interactions" application that allows playback of recorded interactions and live monitoring of interactions. These conventional systems did not integrate interactions with WFM adherence information. The integration between the WFM 310 and the quality monitor 320 described in FIG. 4 allows a supervisor to "drill down" and examine a particular recorded interaction from a display of agent activity and/or adherence information.

In this disclosure, the term "interaction" refers to a record of the content of agent activities related to a call. Note that agent activities are not limited to audio of the call itself. Other forms of media are included. Examples of other types of interactions are: video recording of the agent; application activity on the agent's workstation 120; web pages delivered to the agent and/or customer during collaborative sessions; messages delivered through e-mail, instant messaging, or other messaging technologies. Also, the agent activities in an interaction are not limited to the duration of the call, but can occur after the call (a state called "wrap up" or "research").

The tracking component 355 of the WFM 310 provides information about agent activities to the WFM adherence component 360. Agent activities, which describe work activities performed by agents, are collected from various sources. The call router 140 (FIG. 1) reports agent call states (Available, After-Call-Work, etc.) A monitoring application on agent workstations 120 tracks agent activity on the workstation (e.g., switching between applications, screen data, keyboard input, etc.). If the tracking component 355 malfunctions, the notification engine 397 detects and notifies the malfunction to users of the WFM 310.

The adherence component 360 displays a view 410 of agent activities, typically one agent per line, with activities arranged across a timeline. Exceptions to agent adherence (e.g., non-compliance with customer center policy) are provided to the notification engine 397, which can display the exceptions in conjunction with the activities and the timeline. The adherence component 360 obtains a list 420 of recorded interactions available for agents during the displayed time period. This list of interactions is presented to the user in the same adherence view 410. If the adherence component 360, content recorder 370 and interactions database 375 malfunction, the notification engine 397 detects and notifies the supervisor or agent of the malfunction. Alternatively or additionally, the notification engine 397 can associate and provide the agent activities that produced the exception to the agent adherence. Operation of the notification engine 397 at the integration point between the WFM 310 and the quality monitor 320 is described in relation to FIG. 13.

From the adherence view, a user can "drill down" to a recorded interaction by selecting 430 the interaction from the list, and then activating a playback tool. The adherence component 360 retrieves 440 the selected interaction from the interactions database 375, and the interaction is then played back using an appropriate application (e.g., media player, desktop activity player, web content player). A user can also select an agent activity that is presently occurring and either record on demand 450 or live monitor 460 the selected activity.

Integration between the WFM 310 and the quality monitor 320 is further described in the U.S. patent application 11,359, 357, "System and Method for Integrated Display of Recorded Interactions and Call Agent Data," filed on Feb. 22, 2006.

Figure 5:
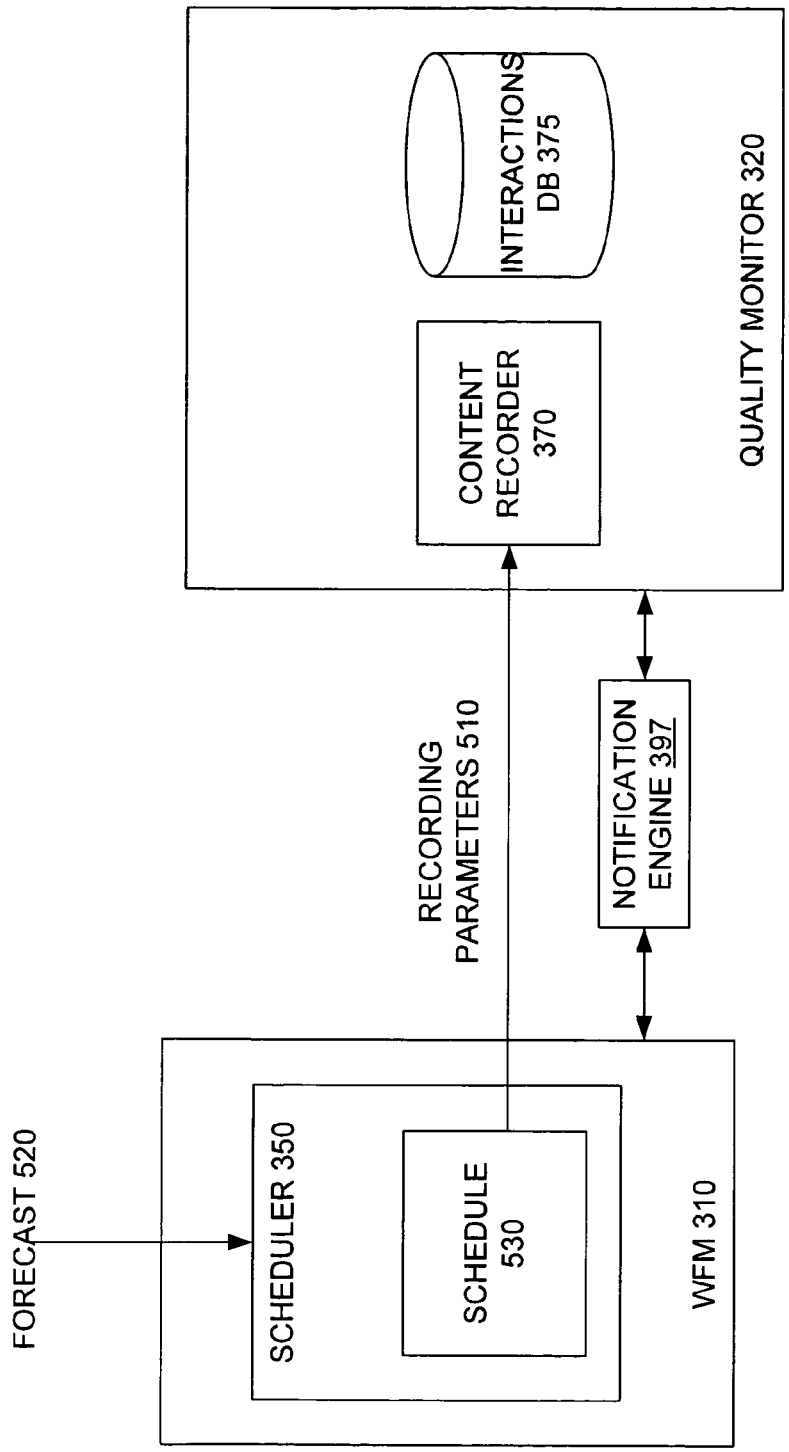
FIG. 5 shows a point of integration between WFM and quality monitor, such as shown in FIG. 3.

FIG. 5 shows an additional point of integration between the WFM 310 and the quality monitor 320, in which agent activity, adherence, and/or scheduling information is used to trigger selective recording in a selective recording environment, or to perform smart selection of recording for evaluation in a total recording environment. In a conventional quality monitor 320, the content recorder 370 can be configured to record a certain number, or percentage, of agent-customer interactions. This parameter is typically fixed for the duration of a campaign, though it can vary from one campaign to the next.

In the integrated system 500, the WFM 310 generates call recording parameters 510 based on information contained in the forecast 520 (e.g., call volume and call type) and/or the schedule 530. The recording parameters 510 are provided to the content recorder 370 in the quality monitor 320. This integration allows the content recorder 370 to adapt recording behavior during a campaign.

As an example of how this feature is useful to a customer center, consider a marketing campaign that starts on a Monday and lasts all week. It is expected that call quality for agents on this campaign can be relatively low on Monday, since the material is new to the agents. By the end of the week, the agents are more familiar with the material, so agent quality scores are expected to increase. If the agent quality scores do not increase after Monday, the notification engine 397 provides an alarm message to a user of the quality monitor 320. The notification engine 397 can provide suggestions to the user such as allocating training classes to the agent to improve the agent quality scores.

The recording parameters 510 provided to the content recorder 370 in the integrated system 500 allow a customer center manager to increase the percentage of interactions recorded at the start of the campaign, and to reduce the percentage as the campaign progresses. The recording parameters 510 can be further associated with one agent, or a set of agents, so that inexperienced agents (e.g., agents with low scores) have a higher percentage of recorded interactions as compared to more experienced agents. The notification engine 397 can also receive the recording parameters 510 and determine whether the quality monitor 320 achieved the recording parameters 510. If not, the notification engine 397 notifies the customer center manager and can indicate reasons for the non-compliance. Operation of the notification engine 397 that facilitates integration between the WFM 310 and the quality monitor 320 is described in relation to FIG. 14.

Other examples of using WFM data to determine recording behavior include: trigger or select recording based on relative elapsed time from the beginning of the shift; trigger or select recording before or after specific activities (e.g., after lunch or before break activity); and trigger or select recording based on adherence data (e.g., agent is on call but not adhering to schedule).

Figure 6:
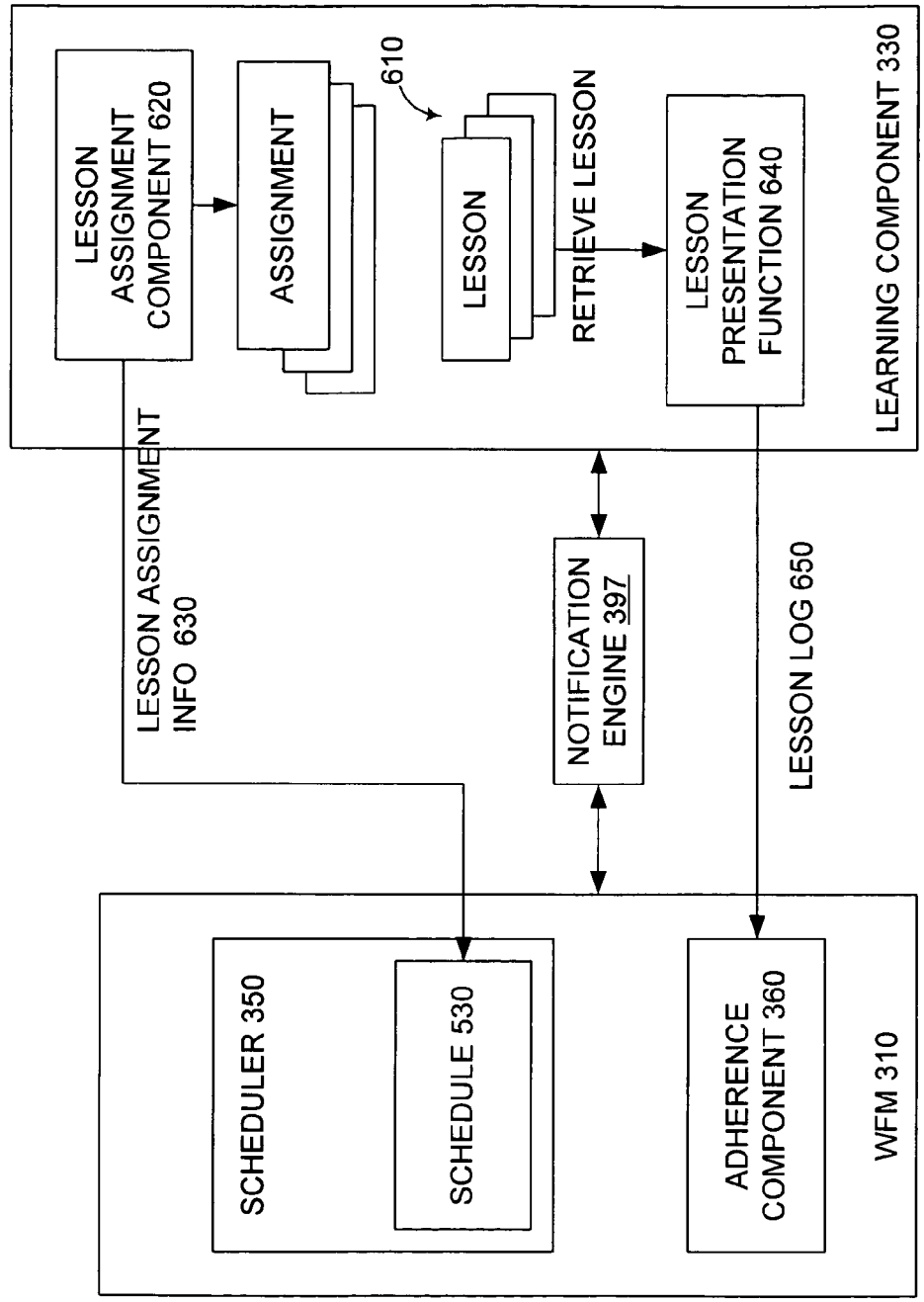
FIG. 6 shows several points of integration between WFM and a learning component, such as shown in FIG. 3.

FIG. 6 shows several points of integration between the WFM 310 and the learning component 330. The learning component 330 includes lessons 610. Each lesson 610 is designed to improve an agent's competence in a particular area. Lessons are assigned, either manually or automatically, through a lesson assignment component 620, which communicates information about the assignment 630 to the scheduler 350 in the WFM 310. In one embodiment, the information 630 includes an agent identifier, a lesson identifier, a lesson duration, and a lesson completion date. After receiving the lesson assignment information 630, the scheduler 350 modifies the schedule 530 to include a training activity for the identified agent. If possible, the new training activity is scheduled before the lesson completion date. The notification engine 397 can monitor whether there was a modification in the schedule 530 and notify the identified agent that the agent's schedule has been modified to include the training activity.

An agent receives training through a lesson presentation function 640. The presentation may take the form of viewing a video and/or listening to audio at the agent workstation 120. The lesson presentation function 640 maintains a lesson log 650, which tracks the presentation of lessons 610 to agents. In one implementation, the lesson log 650 includes an agent identifier, a lesson identifier, the time when the lesson presentation began, and an indication of whether the lesson has been completed.

In yet another point of integration between WFM 310 and the learning component 330, the lesson log 650 is provided to the adherence component 360 in the WFM 310. The adherence component 360 uses information in the lesson log 650 to determine whether an agent has met the lesson completion date. If not, the adherence component 360 notes the incomplete lesson as an exception to adherence. The notification engine 397 receives the exception information and notifies the supervisor or agent of the exception. Alternatively or additionally, the notification engine 397 can send reminders to the agents or supervisors before the lessons are conducted. The operation of the notification engine that facilitates integration between the WFM 310 and the learning component 330 is described in relation to FIG. 15.

Scheduling assigned lessons and tracking adherence to these assignments is further described in U.S. patent application 11/359,194, "Tracking of Lesson Adherence in a Call Center Environment," filed the same day and by the same assignee as the instant application.

Figure 7:
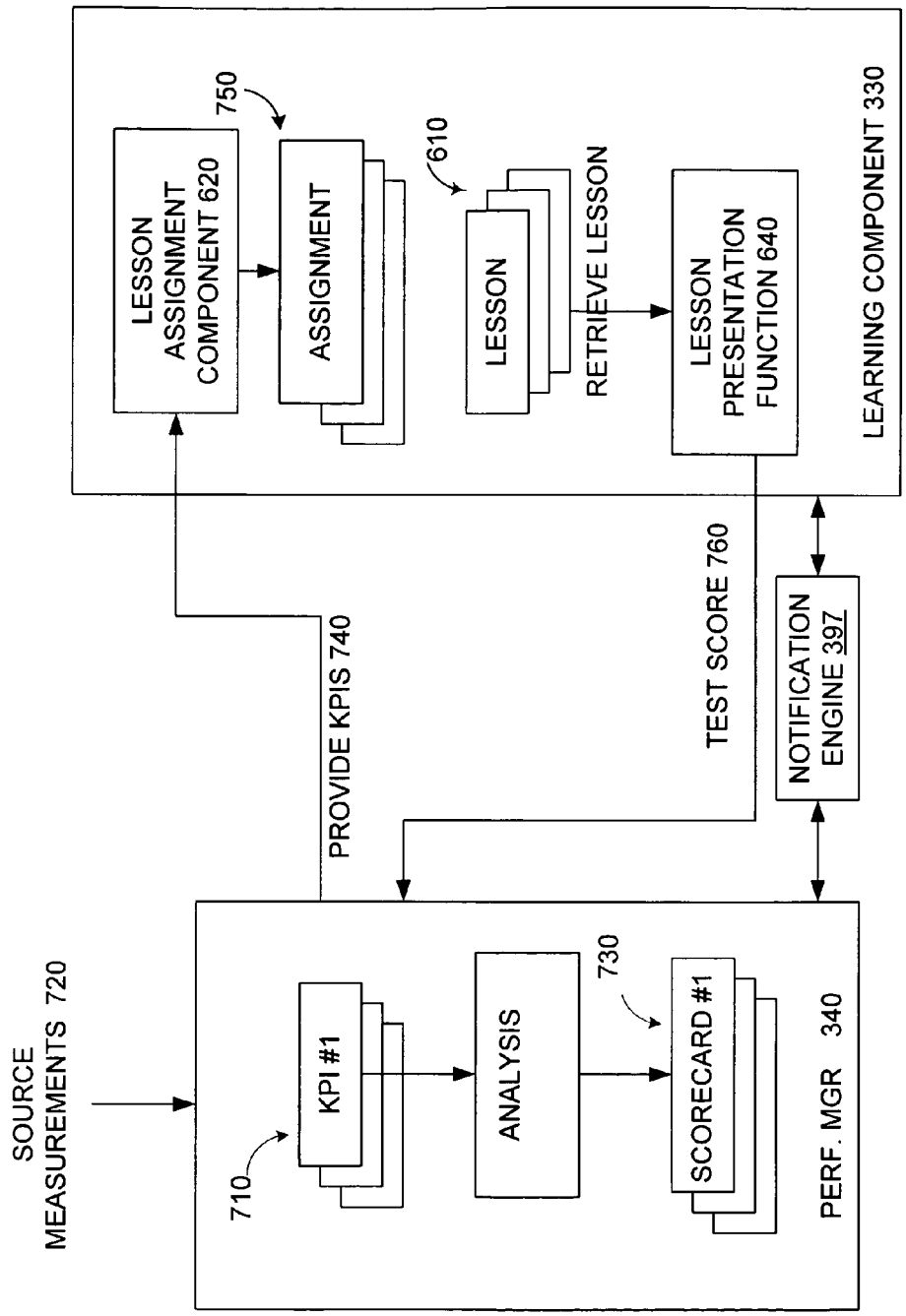
FIG. 7 shows several points of integration between a performance manager and a learning component, such as shown in FIG. 3.

FIG. 7 shows several points of integration between the performance manager 340 and the learning component 330. The performance manager 340 maintains key performance indicators (KPIs) 710 that measure how well an agent or group of agents is performing. The KPIs 710 may be based on one or more source measurements 720, such as evaluations from the quality monitor 320 and call statistics from call router 140 (e.g., call duration, hold time during call, etc.)

The performance manager 340 does analysis on the KPIs 710 and/or the source measurements 720 to produce scorecards 730. The analysis may include calculating statistics such as average, variation, etc., aggregating by time period or groups of agents, and determining trends. The scorecards 730 are then presented in visual form to a user. Examples of scorecards are a daily scorecard for an agent or a team and a scorecard of all agents for the past month.

In the integrated system 700, the KPIs 710 are also provided 740 to the learning component 330. As described earlier, the learning component 330 maintains lessons 610 which can be assigned to an agent for review. In the integrated system 700, each lesson 610 is associated with one or more KPIs 710. The lesson assignment component 620 examines one or more of the KPIs 710 for a particular agent, and makes an assignment 750 for a lesson 610 associated with that KPI 710, based on criteria associated with a KPI or a competency.

In one implementation, the criteria is a comparison of one or more KPIs 710 for an agent to threshold values, and the lesson assignment component 620 assigns a lesson 610 if the KPI 710 is lower than the threshold. This point of integration therefore allows automatic lesson assignment based on KPI 710.

Automatic lesson assignment is further described in U.S. patent application "System and Method for Integrating Learning Systems and Scorecards Systems", filed on Feb. 22, 2006 and having Ser. No. 11/359,359. Alternatively or additionally, the notification engine 397 can monitor and determine whether the KPIs 710 of the agents are below the threshold values and if so, the notification engine 397 can notify the supervisor or agent of their KPIs. The notification engine 397 can further monitor whether the lesson assignment component 620 assigned the lesson 610 due to the low KPIs 710. The notification engine can associate the low KPIs with the lesson 610 and notify that lesson 610 has been assigned to the agent due to the agent's low KPI 710. Alternatively or additionally, the components of the performance manager 340 and lesson assignment component 620 can malfunction, which the notification engine 397 detects and notifies the supervisor or agent of the malfunction.

The presentation may also include a test that is given to the agent to determine competency in the area associated with the lesson 610. In yet another point of integration between WFM 310 and the learning component 330, the agent test score 760 for an agent is provided to the performance manager 340. The performance manager 340 updates the KPIs 710 to reflect the agent competency described by the test score 760. The notification engine 397 can receive the test score 760 and notify the supervisor or agent whether they passed or failed the test. The operation of the notification engine that facilitates integration between the performance manager 340 and the learning component 330 is described in relation to FIG. 16.

Figure 8:
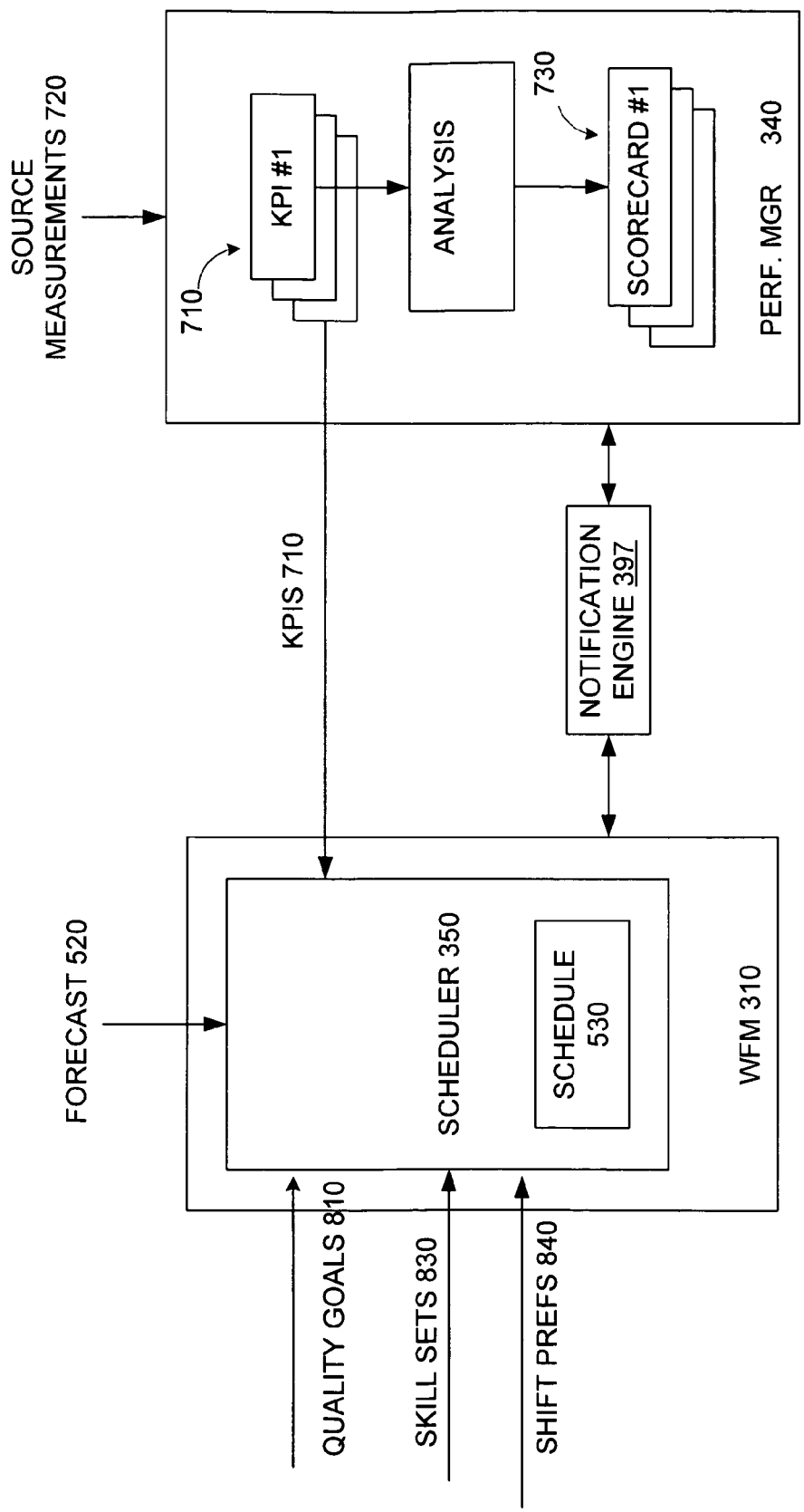
FIG. 8 shows a point of integration between WFM and a performance manager, such as shown in FIG. 3.

FIG. 8 shows a point of integration between the WFM 310 and the performance manager 340. Conventional schedulers allow agents to set preferences for shift assignments (e.g., one agent prefers to work weekends and another prefers to work nights). Since most agents are expected to prefer a day shift rather than a midnight shift, shift preferences are typically combined with agent ranking or seniority, so that someone works the midnight shift. This leads to a situation where the midnight shift is staffed with all of the "worst" agents.

As described earlier, the performance manager 340 maintains KPIs 710 that measure agent and/or group performance. In the integrated system 800 shown in FIG. 8, the scheduler 350 considers agent KPIs 710 when scheduling, so that some "good" agents are also added to the shift. The KPI 710 may reflect, for example, an evaluation of the agent's performance on a set of customer interactions. In one embodiment, the scoring is done by a human while playing back the recorded interaction. In another embodiment, the scoring is at least partly automated through the use of speech analytics.

The agent KPIs 710 are provided to the scheduler 350 in the WFM 310. Also provided to the scheduler 350 are quality goals 810 for a particular schedule interval. Examples of quality goals are "50% of agents have a score at of least 80" and "average score is at least 80."

The scheduler 350 considers the quality goals 810 and the KPIs 710, along with other inputs, to determine a schedule 530 which includes agent assignments to work activities at specific times. The scheduler 350 also considers other inputs, such as a workload forecast 820, agent skill sets 830 and agent shift preferences 840. The scheduler 350 then chooses a mix of agents to work a shift, so that the agent scores combine to meet the quality goals 810. Integration of KPIs and the scheduler is further described in U.S. patent application "Systems and Methods for Scheduling Call Center Agents Using quality Data and Correlation-Based Discovery," filed on Feb. 22, 2006 and having Ser. No. 11/359,731.

The notification engine 397 monitors the schedule 530 to determine whether the schedule is executed. If variance occurs to the schedule, such as an agent calls in sick, the notification engine 397 notifies a supervisor that the agent has called in sick and provides instructions on how to potentially reschedule other agents. The notification engine 397 can automatically notify other agents requesting them to cover the sick agent's shift. The operation of the notification engine that facilitates integration between the WFM 310 and the performance manager 340 is described in relation to FIG. 17.

Figure 9:
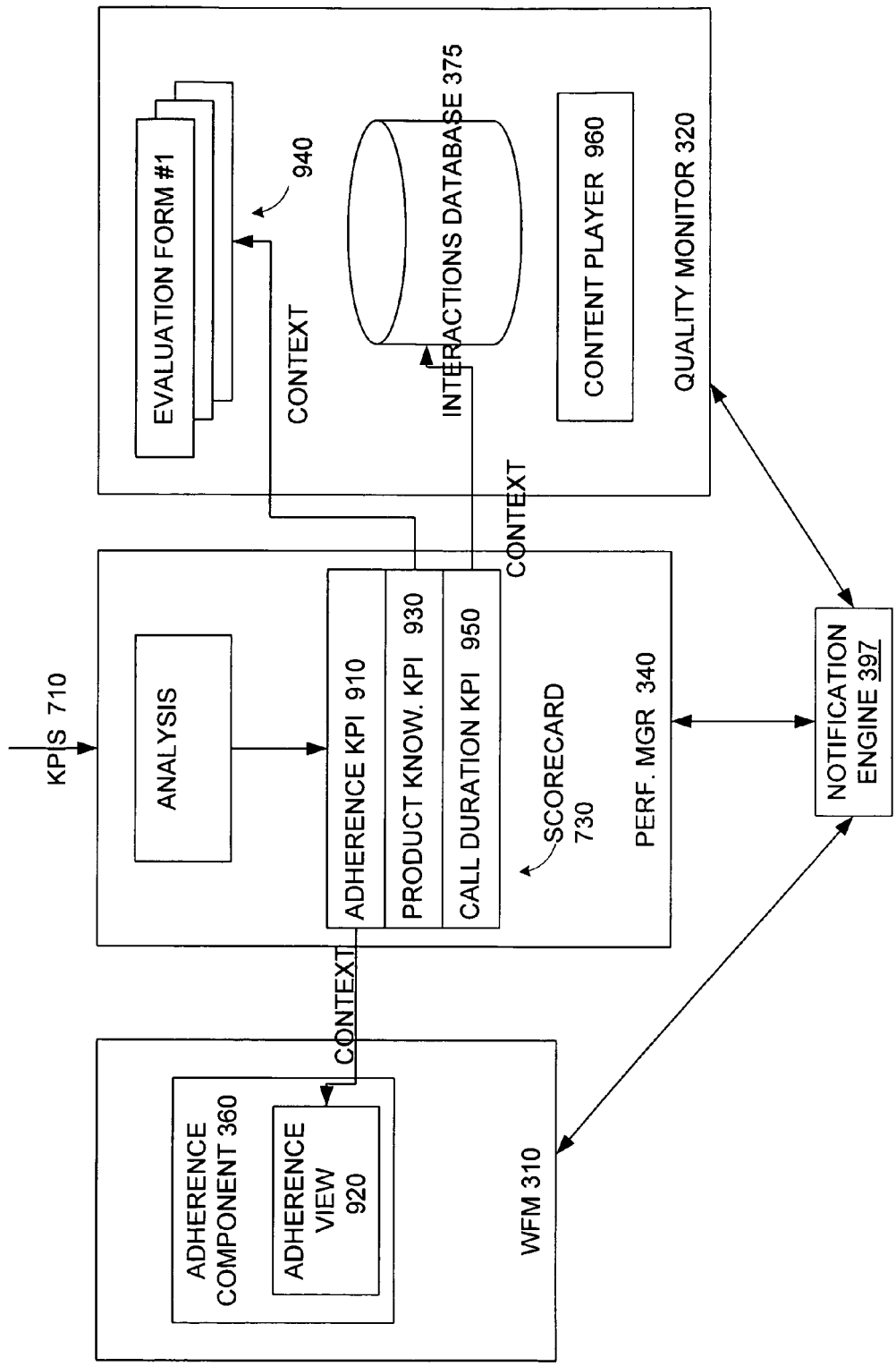
FIG. 9 shows a point of integration between a WFM and a performance manager, such as shown in FIG. 3.

FIG. 9 shows another point of integration between the WFM 310 and the performance manager 340. As described earlier, the performance manager 340 maintains KPIs 710 that measure agent and/or group performance, and produces scorecards 730 from the KPIs 710. The scorecards 730 provide a quick way for a manager to determine areas that require attention. For example, if a particular agent is out of adherence or has a low competency score, then the adherence or competency KPI can be flagged with a warning icon.

Typically, the manager wants more detailed information about the flagged problem area. A conventional customer center solution requires the manager to open up a particular application, such as Adherence or Quality Monitoring, to obtain detailed information about the problem area. Once in the application, the manager must then navigate to the root cause of the problem (e.g., the activity that was out of adherence).

In contrast, the integrated system 900 allows a user to quickly view details associated with the flagged problem area, in the appropriate application context. The notification engine 397 facilitates the integration of the WFM 310, performance manager 340, and quality monitor 320 by monitoring the flagged problem area and notifying the users. Several examples of this use of application context are shown in FIG. 9. When interacting with the performance manager 340, selecting an adherence-related KPI 910 in a scorecard 730 brings the user to a view 920 of adherence information. Furthermore, the particular agent activities that resulted in the out-of-adherence flag 910 are highlighted or otherwise brought to the user's attention in the view 920. Alternatively or additionally, the out-of-adherence flag 910 is sent to the notification engine 397, which notifies the user of the particular agent activities. As another example, selecting a quality score-related KPI 930 brings the user to the quality monitor 320, and more specifically to the particular evaluation form 940 which contains the flagged quality score 930. The user can be notified of the flagged quality score 930 and provided with the particular evaluation form 940 via the notification engine 397. The operation of the notification engine that facilitates integration among the WFM 310, performance manager 340 and quality monitor 320 is described in relation to FIG. 18.

As yet another example, selecting a call statistic-related KPI 950, such as call duration or hold time, brings the user to the quality monitor 320. The quality monitor 320 presents a list of recorded interactions (from the interactions database 375) which contributed to, or are in someway related to, the flagged call-statistic score 950. The user can be notified of the flagged call-statistic score 950 and provided with the list of recorded interactions via the notification engine 397. The user can then play back (960) one of the recorded interactions. The integrated system 900 thus greatly simplifies root cause analysis for customer center personnel.

Call recording and monitoring are vital to customer center operations and the business. Every day, insight and feedback on the organization are gained from customer interactions. Valuable business intelligence can be extracted from these calls to help call center executives improve operational efficiency, customer satisfaction, and profitability. Yet management can only listen to a small segment of recorded calls. Managers must search manually through an enormous number of calls just to find the calls they need to analyze. The process is not only inefficient and expensive, but valuable information is continually ignored, leaving only a small sample of data needed to make informed business decisions.

Figure 10:
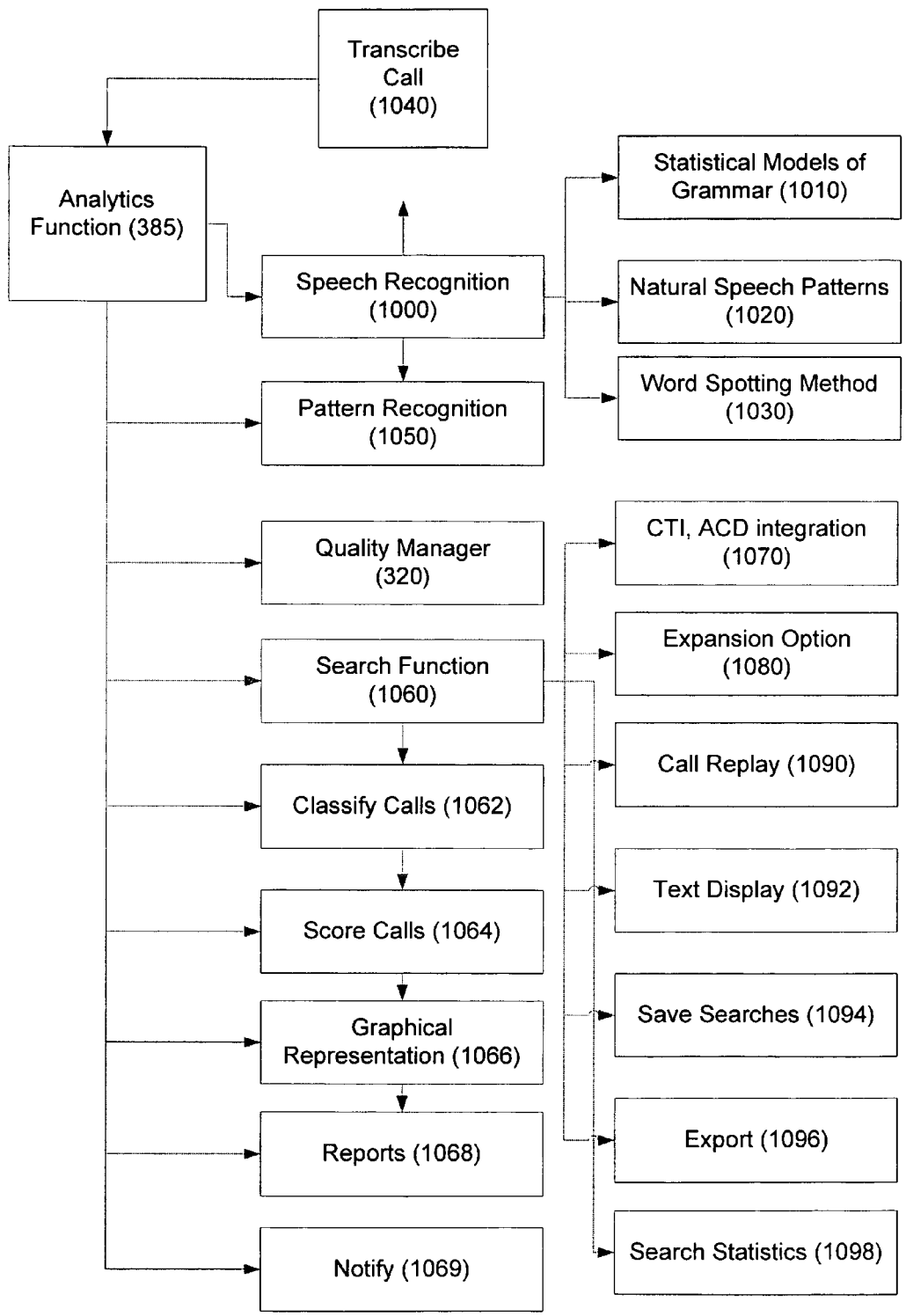
FIG. 10 shows components of the analytics function of FIG. 3.

Referring now to FIG. 10, with the analytics function 385 of the present disclosure (first introduced in FIG. 3), customer centers can now convert all call recordings into actionable business intelligence. Management can discern important competitive and business insight and easily identify trends from customer interactions, by analyzing speech, telephony, agent, and recording data together. In an enhancement, the analytics function 385 also streamlines the quality monitoring process by automatically classifying and scoring calls, based on selection criteria that may include any or part of the data captured by the integrated systems disclosed herein, including speech analytics.

The analytics function 385 enables businesses to: (1) have a more accurate view of the customer experience, which allows executives across the organization to uncover critical customer attitudes, needs, and requirements; (2) automatically score and classify calls for easy retrieval and examination, which enables call centers to digitally score calls to conduct automated quality and customer satisfaction surveys; and (3) discover trends related to customer behavior (e.g., churn, product adoption) that impact the business.

The analytics function 385 preferably uses speech recognition 1000 to convert the recorded calls into a searchable repository that allows for the query of words and/or phrases contained within the recorded calls. This repository may manifest itself as a text transcript or searchable phonetic model of the recorded calls. The analytics function 385 may apply additional unstructured data analysis techniques to refine and extract the context and further meaning from the conversations. Examples of various techniques that may be applied to refine the context of the mined speech, or the speech-to-text conversion, include: statistical modeling of grammar using a statistical model of grammar 1010 module; and natural language processing using a natural speech patterns 1020 module. Further, the analytics function 385 identifies the critical words and phrases within the context of the conversation. All this enables the embodiments disclosed herein to capture the intent of the call, rather than merely the words of the call.

In an alternative embodiment, the analytics function 385 converts the audio of the conversation into a phonetic representation of the call and uses a word-spotting method 1030 (or a query analysis), which flags or tags calls by a specific word, phrase, proximity, inflection, tempo, or emotion. Queries may be performed on an ad-hoc basis or stored for pattern analysis.

With the recorded calls converted to searchable content (via a transcribe call 1040 represented in FIG. 10), the analytics function 385 allows users to look back in time to discover what customers have said. In some embodiments, users do not need to know in advance what they are looking for. For example, if there was a spike in call volume last week, the analytics function 385 can enable the customer center to understand the reason for the increased calls. Also, the user can incorporate metadata obtained from telephony or CRM systems to gain further insight into the reasons for the call spike.

In an enhancement, the analytics function 385 also uses a pattern recognition module 1050 to pull meaning out of the results generated by speech recognition. The pattern recognition module 1050 discerns the call's pattern and automatically places the call into one or several categories once the call is ingested into the speech engine, based on context the pattern recognition module 1050 is able to extract from the speech mining function. The patterns are used not only to classify calls but also to determine if a particular activity has occurred during the call, or to automatically score individual evaluation or survey questions based on this data. For instance a call score might be correlated to an existing evaluation or customer survey question during the call (e.g., "did the agent offer a cross sell", "did the agent remember to read the corporate policy"). By automating the labor-intensive quality monitoring processes, customer centers can realize not just a fast return on investment, but also deploy resources where they are strategic to the call center.

The analytics function 385 can link the call content to the metadata from, for example, a quality monitoring component (see FIG. 3), to relate characteristics such as agent ID, time/date, speaker's name, workgroup ID, and call routing. The analytics function 385 can link to custom data sources that may contain other information related to the agent/customer interaction, for example, a CRM system.

The analytics function 385 also includes a search function 1060. An append feature in the search function allows the user to modify the initial search by tacking on additional criteria and logic. A refine feature function allows the user to add to the search criteria, which are then used on the results of the last search. A remove feature allows the user to modify the initial search by tacking on additional criteria and logic. An undo feature allows any of the modifications just described to be reversed. In one enhancement, results from the initial search string using the search function 1060 can be refined to help focus on particular calls of interest. In another enhancement, users can combine the search functionality described above with data from the CTI, ACD and other sources via a CTI ACD integration 1070 module.

Different individuals use different words or phrases to depict a similar meaning. Recognizing this fact, the analytics function 385 enables users to expand single words into complete concepts, which convey intent and meaning, rather than being tied to one narrow possibility. An expansion option 1080 allows users to include plural, synonym, homonym, and containing words, in a single clean screen. For example, instead of searching for the single word "bill", the user can select to search for "bill, bills, account, charges, invoice, statement, billing, billed, bell", which will most likely return better results because it takes into account the differences of expression.

In one enhancement, the expansion option 1080 allows for the identification of temporal relationships between words, phrases and other collected events in order to better identify the context of the conversation. For example, a search that includes the word "supervisor" in a temporal relationship with words like "transfer me to", or in relationship to a call transfer event, can provide much more context than a search for "supervisor". The expansion option allows users to capture more instances of the concept that they are exploring and furthermore establish the intent of the calls. This improves upon keyword-spotting technologies, which are not good enough to perform ad-hoc searching for concepts, which is the ultimate goal in content discovery.

The analytics function 385 further enables the user a variety of ways to derive insight from the search results. The Call Replay 1090 component allows the user to listen to an audio file from the search results, in part or in its entirety. Playing a portion of the audio allows the user more efficiently to go through the search results without having to waste time listening to the whole conversation. The Text Display 1092 component shows a continuous text for the entire recognized content when playing back part or all of a call. This allows users to quickly capture terms and expressions exchanged in the call that might be of importance. The Save Searches 1094 component allows a user to save and easily retrieve searches for further refinement and analysis. The Export 1096 component allows search results to be exported to a wide variety of formats, such as Microsoft Excel or Adobe PDF format. The Search Statistics 1098 component displays information on the current search (e.g. calls counted, search time). In one enhancement, the analytics function 385 further includes a call visualization component which includes an interface for displaying the text of a set of calls along with other data captured by the integrated system of the present disclosure along with integrated sources. A call visualization component is more fully described in the '705 application and incorporated by reference above.

Preferably, the analytics function 385 automatically classifies and scores calls via classify calls 1062 module and a score calls 1064 module. This feature can greatly reduce the time and effort that customer centers spend on the quality monitoring process by "structuring" unstructured voice recordings and categorizing them. The classify calls 1062 module preferably classifies calls based on the content. A call may be classified into one or more "buckets." The analytics function 385 relies on the concept that all conversational threads have at their core one or more "patterns" of speech.

Patterns are complex descriptions of different ways that people communicate information, not just simple "words" for matching. These patterns of speech do not have to contain exact word matches for particular search terms, but they only "look" like a specific pattern. Each pattern is defined and assigned a weight by the pattern developer, and each area of intent is assigned a threshold. If a group of patterns match and their added weights exceed the threshold, then that conversation is said to "look" like and contain that intent.

The weights and threshold are user definable and therefore easily tweaked to produce better and more accurate results. A typical intent "bucket" will contain anywhere from five to 100 "patterns" to match. Patterns can be shared across domains and industries, and pattern bases can evolve forward to deliver ever more accurate and finely tuned pattern matching.

The analytics function 385 uses patterns not only to classify calls via the classify calls 1062 module, but also to evaluate if a particular activity occurred during a call via the score calls 1064 module. The user begins by designating the objective criteria on which the calls are to be scored into the application. A set of patterns is then described for the criteria. A call is then scored based on the extent to which the criteria patterns were fully met, partially met, or not met at all. Each weighted threshold for each score level can be customizable.

The analytics function 385 allows the user to create a graphical representation of trends found in the calls via a graphical representation 1066 module. This enables a user to view statistics about complex trends over a large time period.

The trend view displays a suite of ad-hoc reports that can be easily configured by the parameters in Table 1.

TABLE 1

| Time/Day Interval | Value to Calculate | Segmentation |
| --- | --- | --- |
| Day of Week | Avg # Words Per Call | By Agent |
| Month | Avg Call Length In Seconds | By Agent Group |
| By Week | Call Count | By Content Group |
| By Quarter | Hit Total | By Customer Account |
| By Year | Sum (WAVLength) | By Department |
| By Location | | |

By visualizing the information such as by the parameters above, the user can gain a more detailed view on the particularities of the search phrases.

Another trending capability is the display of, for example, the top 200 words mentioned in the recorded calls (where the number of top words is customizable). The analytics function 385 proactively shows the words that are unusually more frequent than before or compared to the standard language. This acts as an "early warning system" to enable organizations to understand how the conversations have changed from one period to the next.

Preferably, the analytics function 385 organizes and delivers results customized to the end-user's requirements via a reports 1068 module. In an enhancement, reports 1068 module allows for scheduling options that enable users the ability to vary frequency of report delivery so analysts can zoom in on critical data metrics hourly, daily, monthly, etc. Users can customize and automate reporting. Once a query is created, the user can save the query to run automatically. Users can create and view reports in different formats while using the web-based viewer. For example, reports can be output as Excel or PDF files, and then emailed. The reports are interactive, in that calls can be played back from the results of the report. The reports 1068 module, which is preferably based on industry-standard databases such as SQL, can be used to customize reports, to extract, format and report from the underlying data. In another enhancement, the reports 1068 module is a dashboard reporting system which can, for example, link the actual calls detected for each event or report.

Preferably, the analytics function 385 provides business rules, goals, and specification of the integrated system to the notify 1069 module. Notification messages from the notify 1069 module can be sent ad-hoc and customized to an individual or group or delivered based on business rules or scheduled event triggers to a group of users. The notify 1069 module can be set to deliver a notification at a specific time in the future or on a scheduled or periodic basis. The notify 1069 module analyzes the received business rules, goals, and specification of the integrated system. The analysis enables the notify 1069 module to monitor the integrated system and notify users of the system of areas that need attention.

For example, in an enhancement, the notify 1069 module can monitor the schedule of agents and determine whether there are any variances from the schedule, such as agents being out sick for a certain period of time. The notify 1069 module can notify other agents to "fill-in" for the agent's shift. The notify 1069 module can further notify the supervisor of the problem so that the problem can be quickly resolved. In another example, the notify 1069 module monitors the performance of the agent and determines that the agent is not reaching its goals via, for example, quality monitoring. The notify 1069 module can notify the agent or supervisor of the "bad" performance. Alternatively or additionally, a user may want to configure sending automatic triggers once an individual or group has fallen below an acceptable threshold for a key performance indicator. The notify 1069 module can further provide suggested training lessons determined by the learning component and the time and place that the training lesson can be taken determined by the WFM. In another example, the notify 1069 module monitors the performance of the agent and the customer center and provide reports on a periodic basis (e.g., weekly, monthly, bimonthly, quarterly, biannually, and yearly) to the supervisor for key metrics of customer center, scorecard of agents after training lessons, "bad" scorecard of agents, and handle-time of agents, for example.

In yet another example, a manager initiates a live monitor session. While reviewing a live call with an agent, the manager realizes that the agent behavior does not reflect proper company policy. The notify 1069 module provides applications that the manager could use to send a customized alert message directly to the agent to discuss the issue or a link to a document or training clip that describes proper company policy. In yet another example, a quality manager may choose to set up an automatic notification trigger that notifies an agent every time an evaluation has been completed for a specific agent. This notification could be sent automatically via email, pop-up message, or text message. The message could contain a link so the agent can review the application or play the recorded call that generated the evaluation.

In yet another example, a scheduler may review the workflow schedule for a group of agents and realize that call volumes exceed what was anticipated for that day and queue time is in excess of what is desired. The scheduler may choose to send an alert to a group of agents to change procedures to better address the situation or to send a request to volunteer to work overtime to fill the need. Another use would be to send messages for shift bidding and have a bi-directional means for agents to give their approval to work and overtime requests. In yet another example, a training manager may choose to automatically notify agents when they have been assigned a lesson. The training manager also may choose to send the notification instantly via an email, pop-up message, or text message requesting that the agent to log off the phones and take the training at a scheduled time.

Figure 11:
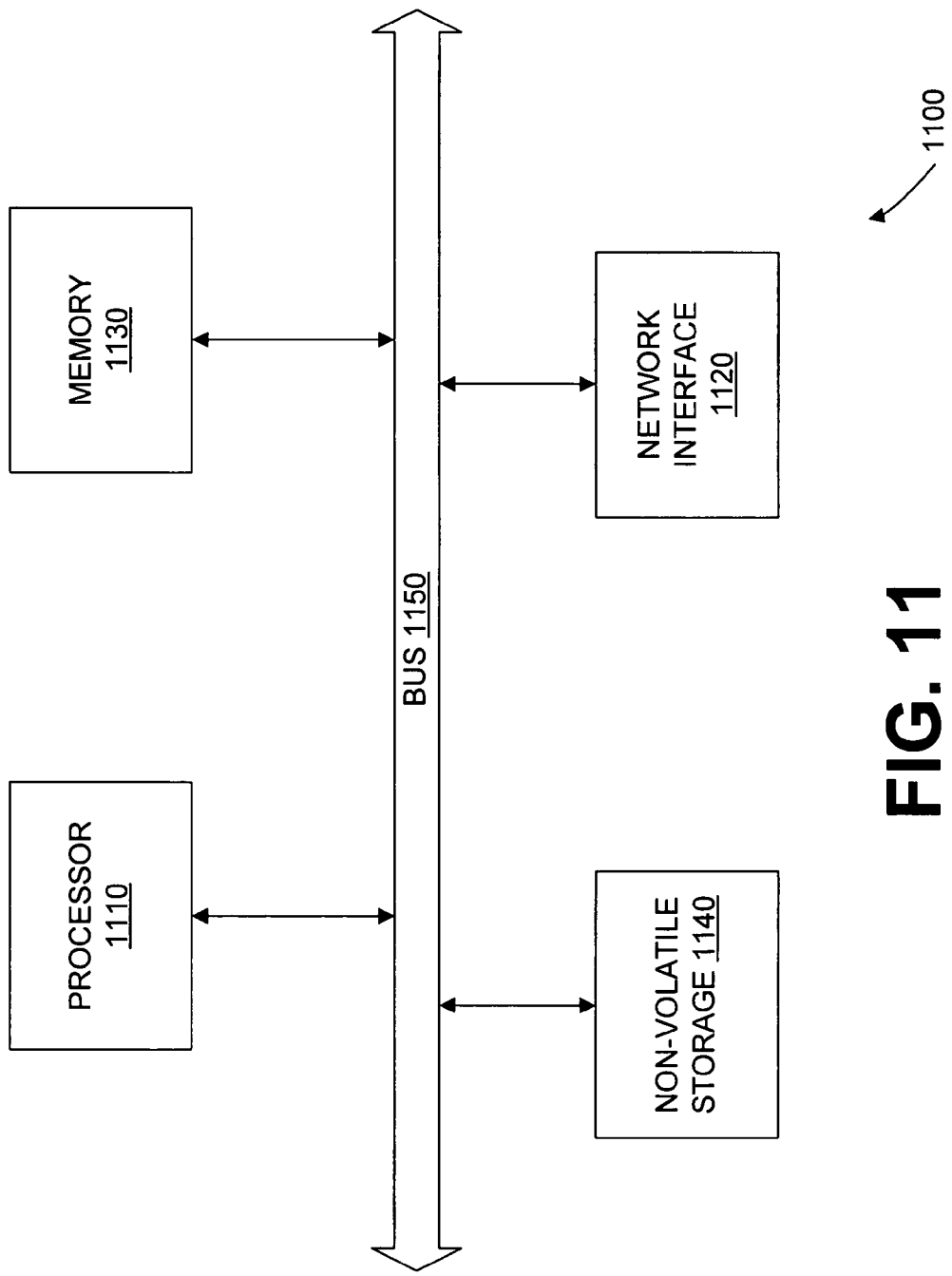
FIG. 11 is a block diagram of a general-purpose computer that can be used to implement one or more of the components of the integrated customer center systems, processes or methods.

FIG. 11 is a hardware block diagram of a general-purpose computer 1100 that can be used to implement one or more of the components of the integrated customer center system 300 disclosed herein. The computer 1100 contains a number of components that are well known in the art of call center software, including a processor 1110, a network interface 1120, memory 1130, and non-volatile storage 1140. Examples of non-volatile storage include, for example, a hard disk, flash RAM, flash ROM, EEPROM, etc. These components are coupled via a bus 1150. The memory 1130 contains instructions which, when executed by the processor 1110, implement the methods and systems disclosed herein. Omitted from FIG. 11 are a number of conventional components, known to those skilled in the art that are unnecessary to explain the operation of the system 1100.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of certain embodiments of the present disclosure includes embodying the functionality of the preferred embodiments of the present disclosure in logic embodied in hardware or software-configured mediums.

Figure 12A:
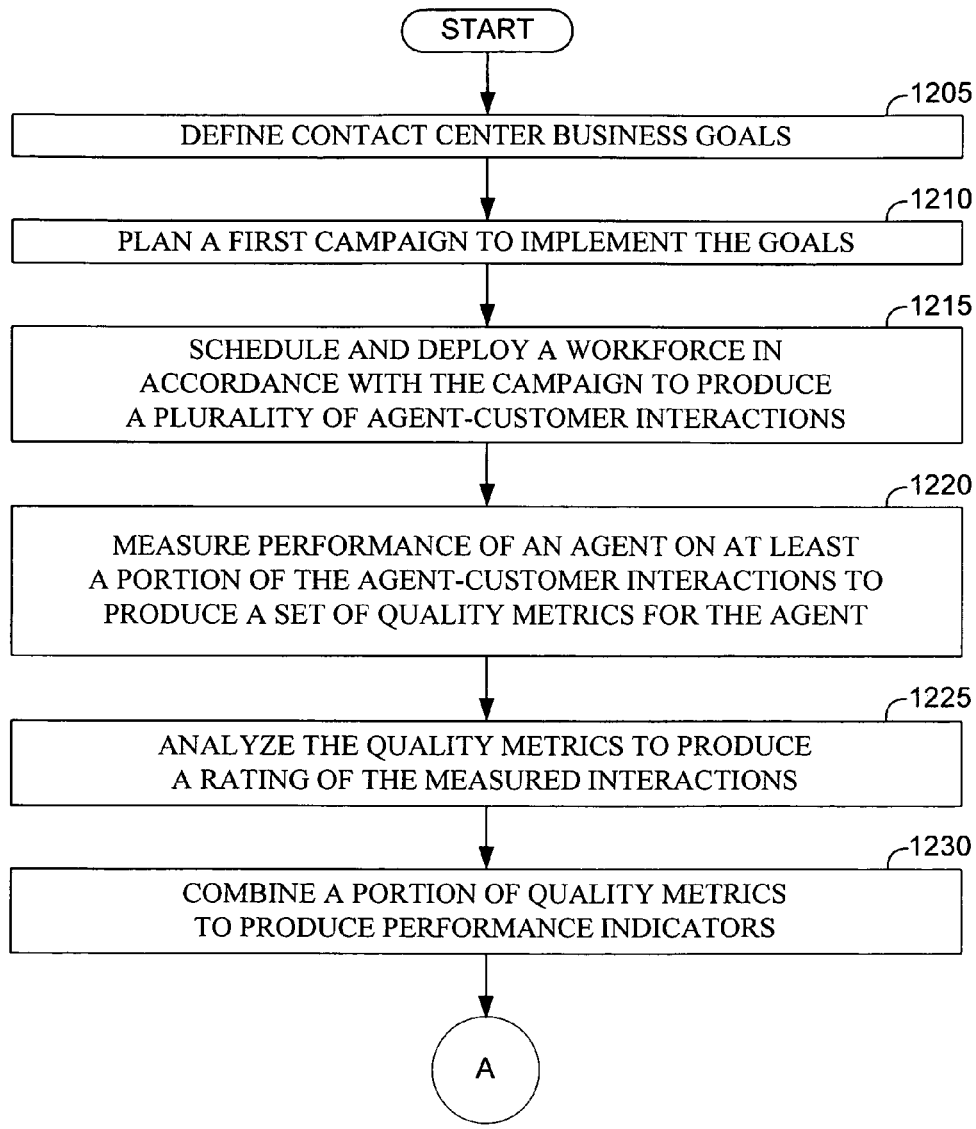
FIG. 12 is a flow diagram that illustrates high-level operation of a notification engine, such as shown in FIG. 3.
Figure 12B:
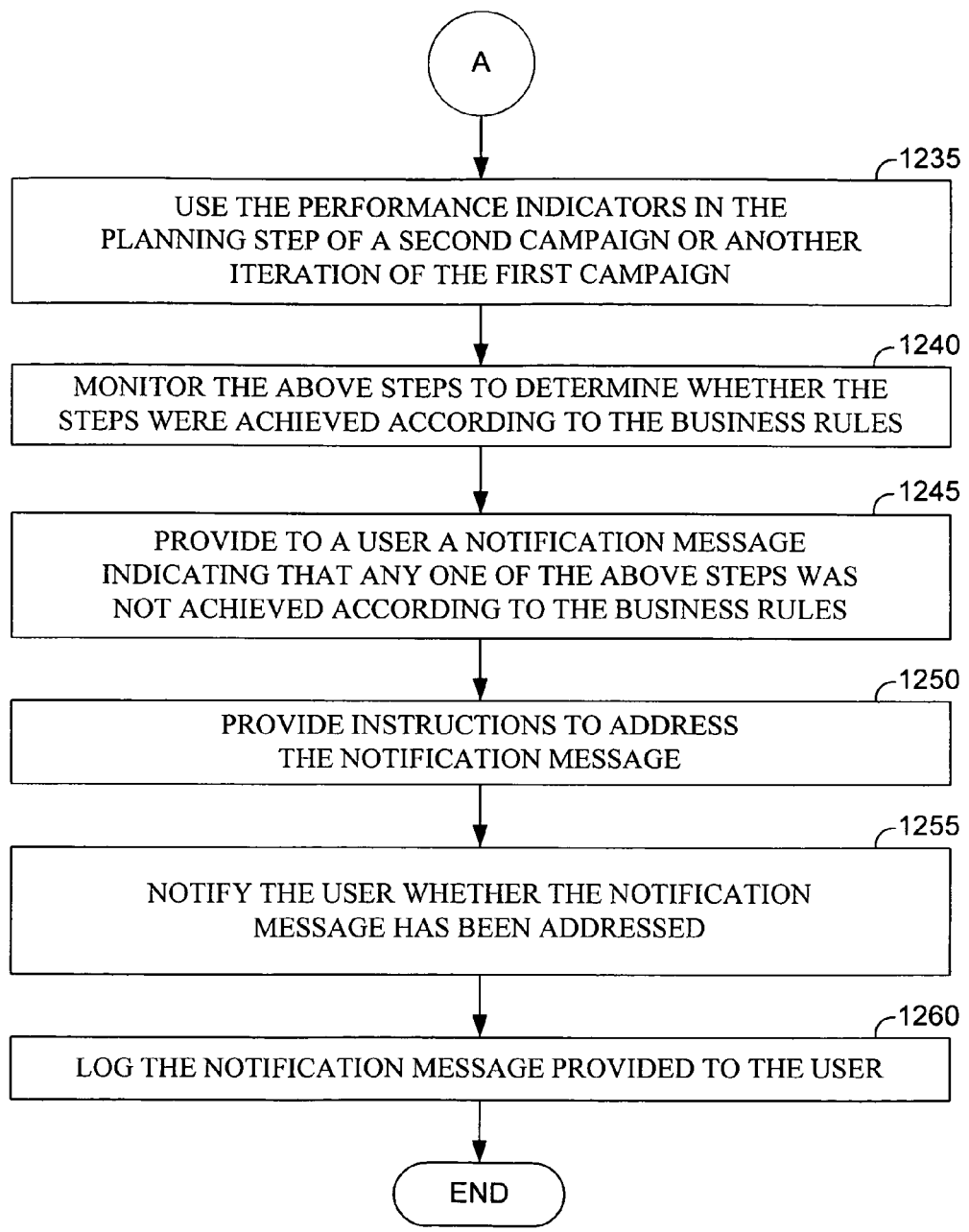

FIG. 12 is a flow diagram that illustrates a high-level operation of a notification engine, such as shown in FIG. 3. Beginning with block 1205, the customer center business goals are defined and in block 1210, a first campaign is planned to implement the goals. In block 1215, a workforce is scheduled and deployed in accordance with the campaign to produce a plurality of agent-customer interactions. In block 1220, performance of the agent is measured on a portion of the agent-customer interactions to produce a set of quality metrics for the agent. In block 1225, the quality metrics are analyzed to produce a rating of the measured interactions, and in block 1230, the portion of quality metrics is combined to produce performance indicators.

In block 1235, the performance indicators are used to plan a second campaign or another iteration of the first campaign. In block 1240, the above steps are monitored to determine whether the steps were achieved according to the business rules. In block 1245, a user is provided a notification message indicating that any one of the above steps was not achieved according to the business rules. In block 1250, instructions are provided to address or resolve the notification message. In block 1255, the user is notified whether the notification message has been addressed. In block 1260, the notification message is logged into a database.

Figure 13:
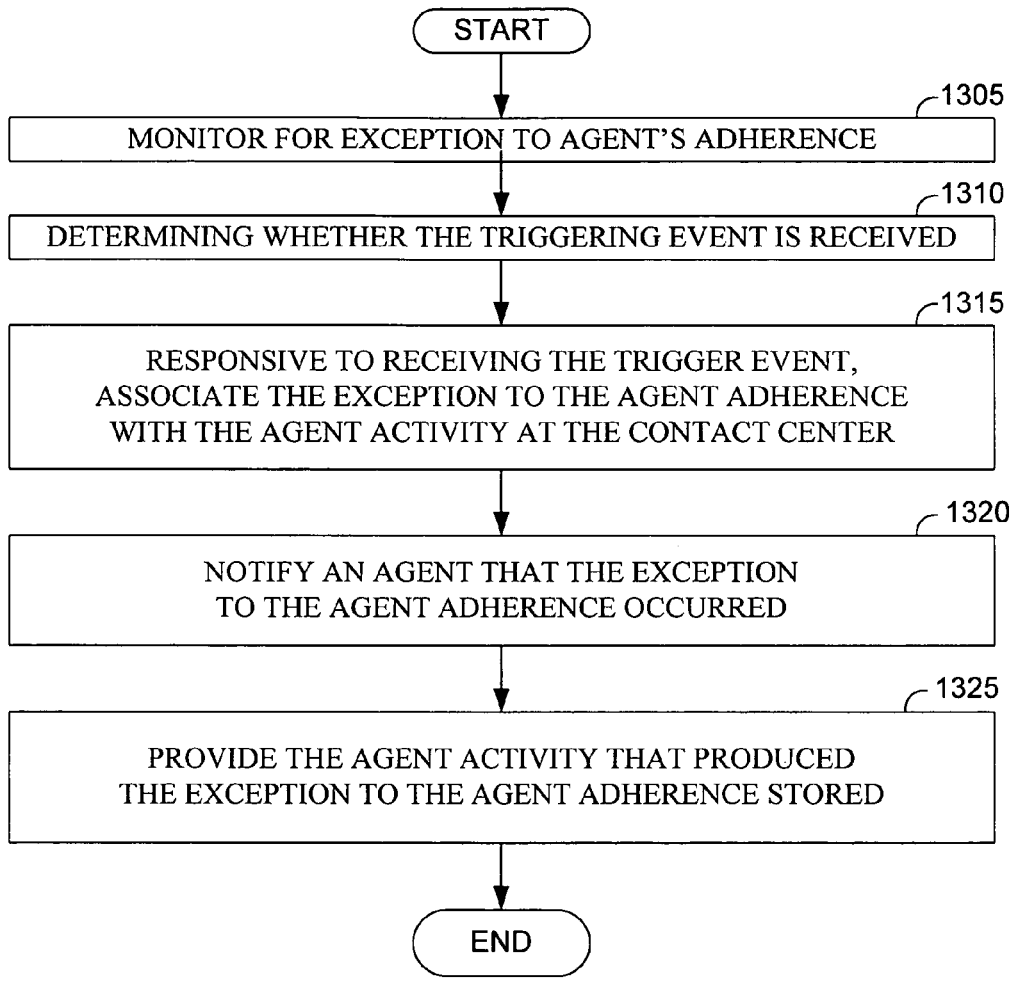
FIG. 13 is a flow diagram that illustrates operation of a notification engine that facilitates integration between a WFM and a quality monitor, such as shown in FIG. 4.

FIG. 13 is a flow diagram that illustrates an operation of a notification engine that facilitates integration between work force manager and quality monitoring, such as shown in FIG. 4. Beginning with block 1305, the operation includes monitoring for an event trigger indicating an occurrence of an exception to agent adherence. The agent adherence is determined from agent activities at the customer center. The exception to agent adherence includes at least one of poor interaction with customers, no-showing of a training lesson, poor test scores from a training lesson, and poor attendance, for example. In block 1310, the notification engine determines whether the triggering event is received, and in block 1315, responsive to receiving the trigger event, the exception is associated with an agent activity at the customer center.

In block 1320, the agent is provided with a notification message indicating that the exception to the agent adherence occurred. In block 1325, the agent and supervisor are provided with the agent activity that produced the exception to the agent adherence. In particular, the notification engine can provide the agent activities by obtaining a list of agent activities stored in an interaction database, selecting from the list the agent activity that produced the exception to the agent adherence, and retrieving the agent activity from the interaction database.

Figure 14:
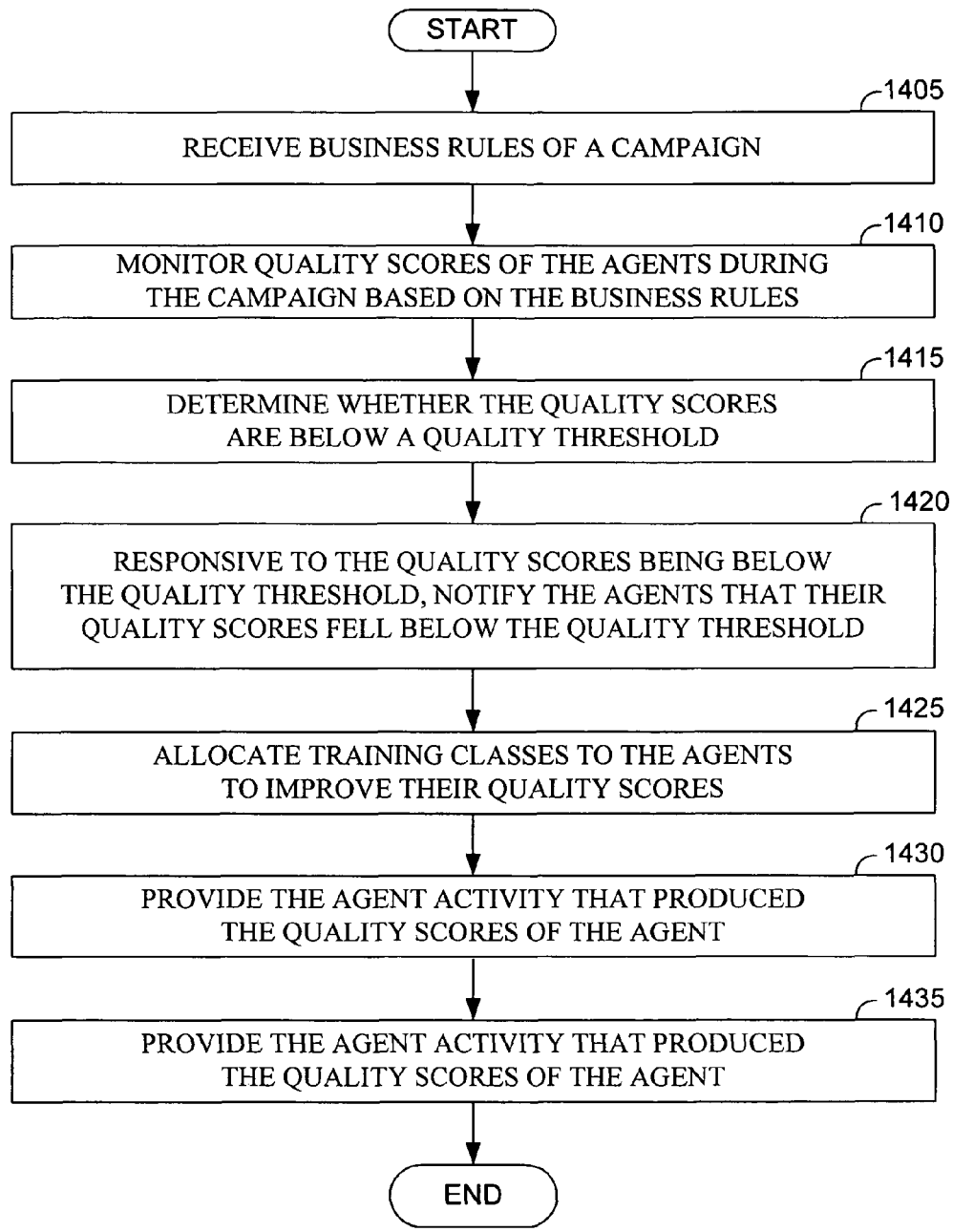
FIG. 14 is a flow diagram that illustrates operation of a notification engine that facilitates integration between a WFM and a quality monitor, such as shown in FIG. 5.

FIG. 14 is a flow diagram that illustrates an operation of a notification engine that facilitates integration between work force manager and quality monitoring, such as shown in FIG. 5. Beginning with block 1405, the operation includes receiving business rules of a campaign, which includes the schedule of agents. In block 1410, quality scores of the agents are monitored during the campaign based on the business rules. In block 1415, the notification engine determines whether the quality scores are below a quality threshold. In block 1420, responsive to the quality scores being below the quality threshold, the agents are provided with notification messages indicating that their quality scores fell below the quality threshold. In block 1425, the agents are allocated training classes to improve their quality scores, and in block 1430, the agents and supervisor are provided with the agent activity that produced the quality scores of the agent.

Figure 15:
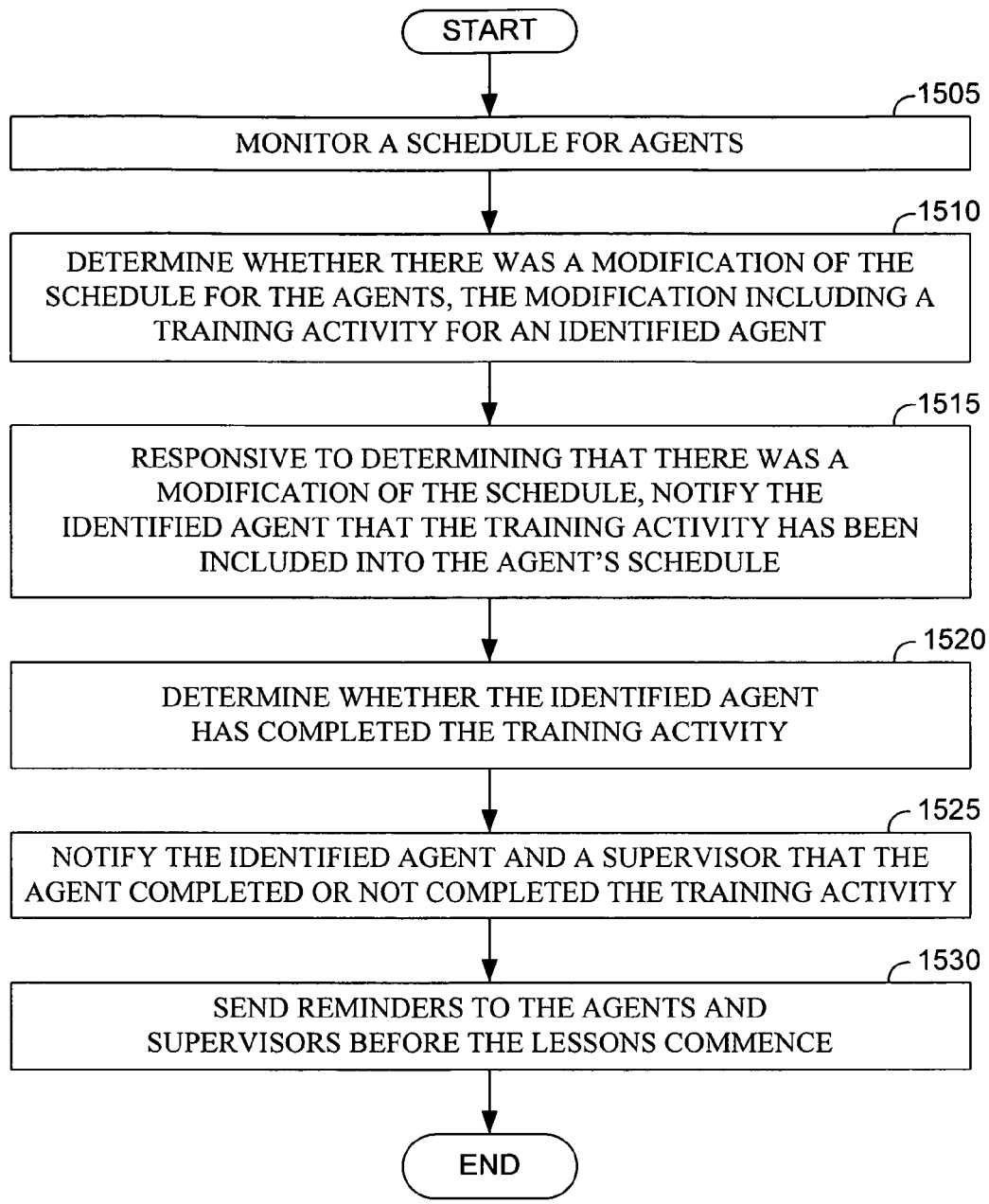
FIG. 15 is a flow diagram that illustrates operation of a notification engine that facilitates integration between a WFM and a learning component, such as shown in FIG. 6.

FIG. 15 is a flow diagram that illustrates an operation of a notification engine that facilitates integration between work force manager and learning component, such as shown in FIG. 6. Beginning with block 1505, the operation includes monitoring a schedule for agents, and in block 1510, determining whether there was a modification of the schedule for the agents. The modification includes, but is not limited to, a training activity for an identified agent. In block 1515, responsive to determining that there was a modification of the schedule, the identified agent is provided with a notification message indicating that the agent agent's schedule has been modified with the training. In block 1520, the notification engine determines whether the identified agent has completed the training activity. For example, the notification engine can receive a lesson log that includes information about whether the identified agent has completed the training activity. In block 1525, the identified agent and supervisor are notified that the agent completed or not completed the training activity. In block 1530, reminders can be sent to the agents and supervisors before the lessons commence.

Figure 16:
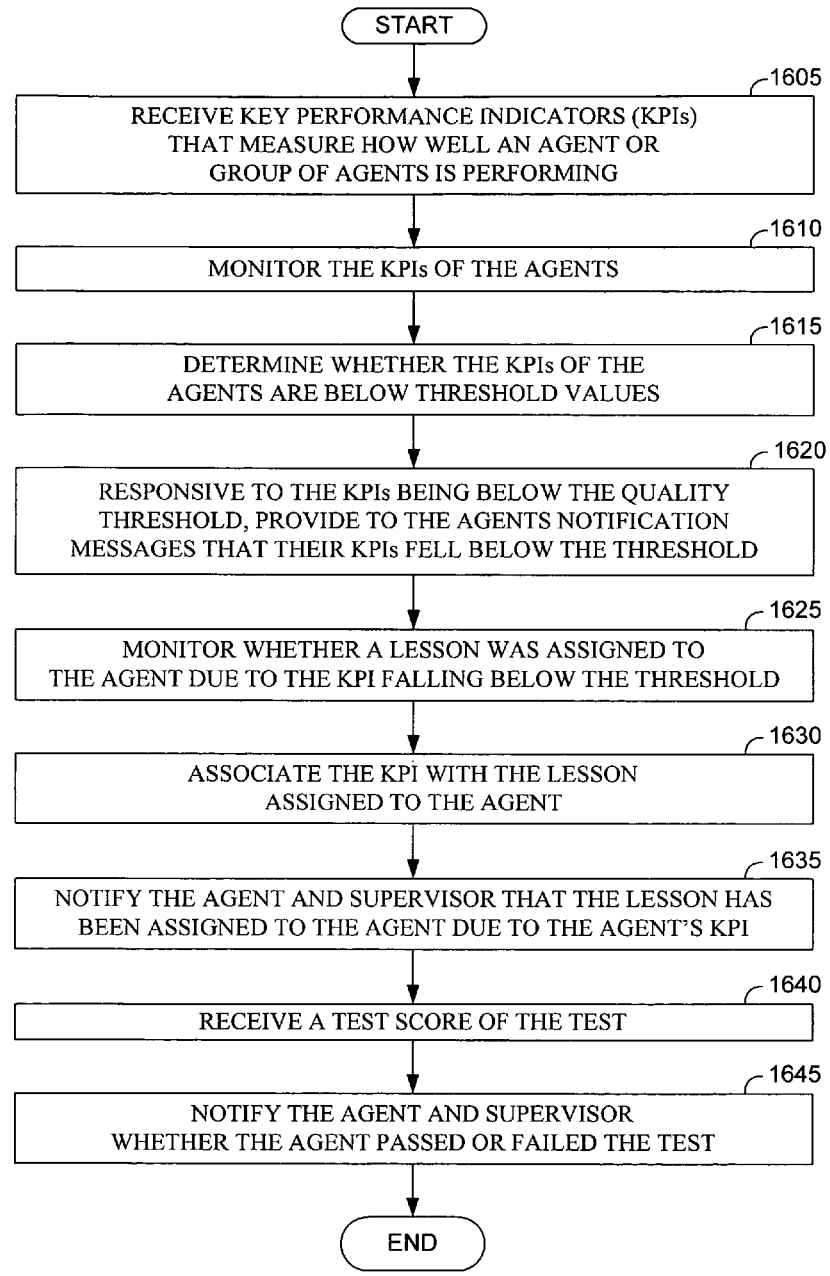
FIG. 16 is a flow diagram that illustrates operation of a notification engine that facilitates integration between a performance manager and a learning component, such as shown in FIG. 7.

FIG. 16 is a flow diagram that illustrates an operation of a notification engine that facilitates integration between performance manager and learning component, such as shown in FIG. 7. Beginning with block 1605, the operation includes receiving key performance indicators (KPIs) that measure how well an agent or group of agents is performing. In block 1610, the notification engine monitors the KPIs of the agents, and in block 1615, determines whether the KPIs of the agents are below a predetermined threshold. In block 1620, responsive to the KPIs being below the predetermined threshold, the agents are provided with notification messages indicating that their KPIs fell below the predetermined threshold.

The agents can be assigned to a lesson because their KPIs fell below the predetermined threshold. In block 1625, the notification engine monitors whether a lesson was assigned to the agent and in block 1630, associates the KPI that fell below the predetermined threshold with the lesson assigned to the agent. In block 1635, the agent and supervisor are notified that the lesson has been assigned to the agent due to the agent's KPI. The agent can be provided a test to determine competency in the area associated with the lesson. In blocks 1640 and 1645, the notification engine receives a test score of the test and notifies the agent and supervisor whether the agent passed or failed the test.

Figure 17:
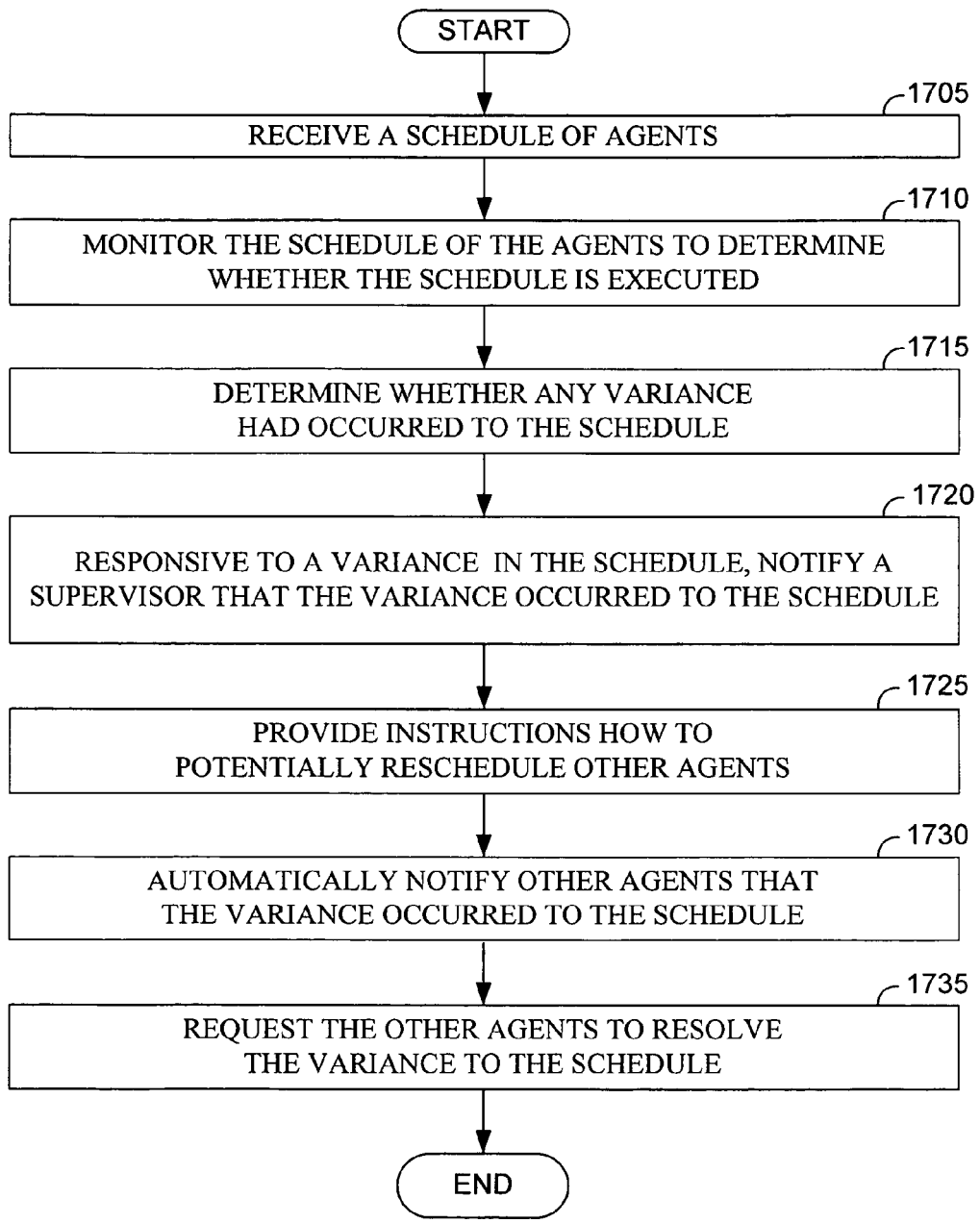
FIG. 17 is a flow diagram that illustrates operation of a notification engine that facilitates integration between a performance manager and a learning component, such as shown in FIG. 8.

FIG. 17 is a flow diagram that illustrates an operation of a notification engine that facilitates integration between work force manager and performance manager, such as shown in FIG. 8. Beginning with block 1705, the operation includes receiving a schedule of agents, and in block 1710, monitoring the schedule of the agents to determine whether the schedule is executed. In block 1715, the notification engine determines whether any variance had occurred to the schedule. A variance to the schedule can be, for example, an agent who is sick and cannot work. In block 1720, responsive to a variance in the schedule, a supervisor is provided with a notification message indicating that the variance occurred to the schedule. In block 1725, instructions are provided on how to potentially reschedule other agents, and in block 1730, other agents are automatically notified that the variance occurred to the schedule. In block 1735, the notification engine requests the other agents to resolve the variance to the schedule. For example, the other agents can receive a bid for the shifts that are available.

Figure 18:
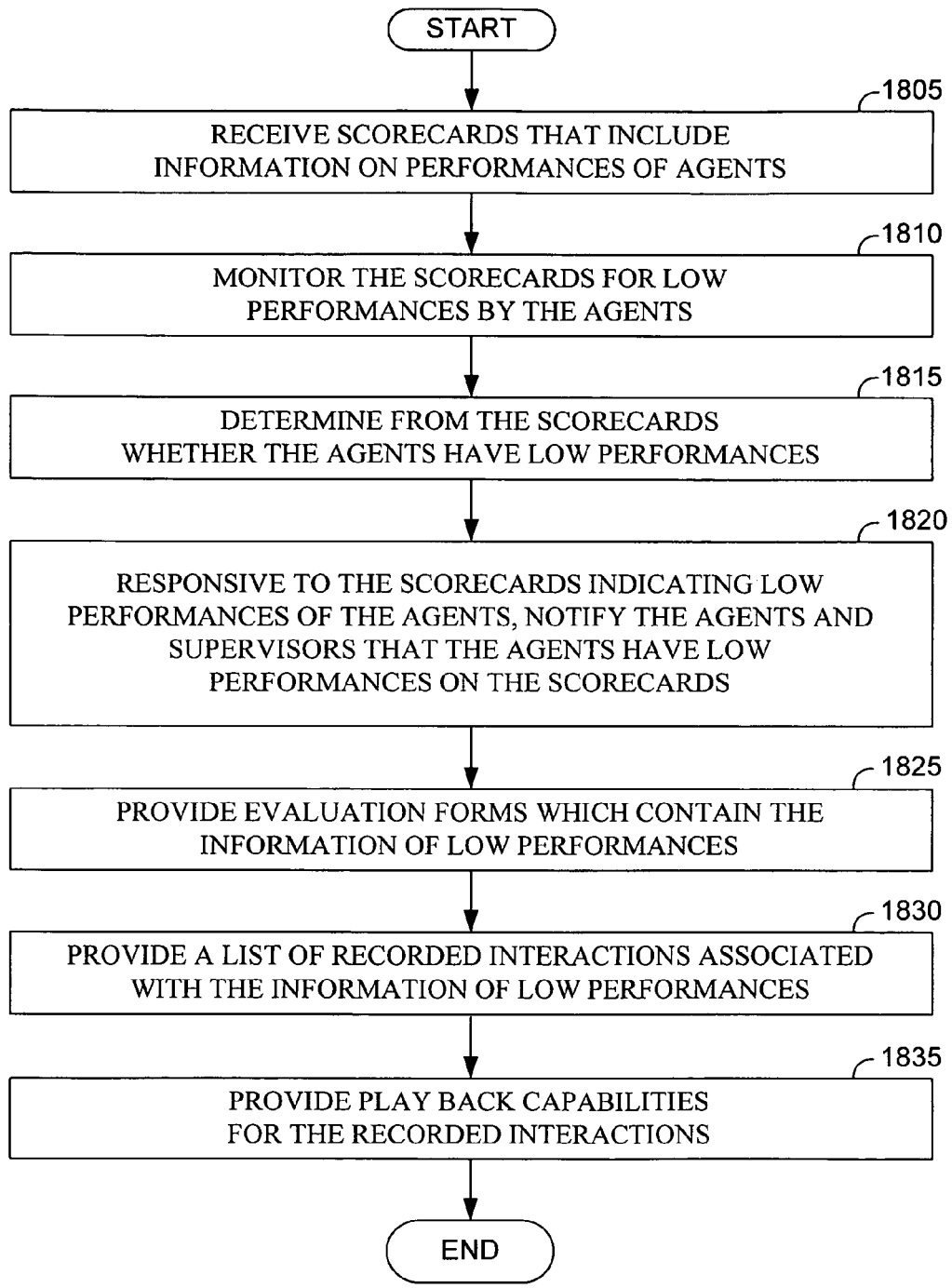
FIG. 18 is a flow diagram that illustrates operation of a notification engine that facilitates integration between a WFM and a performance manager, such as shown in FIG. 9.

FIG. 18 is a flow diagram that illustrates an operation of a notification engine that facilitates integration among work force manager, performance manager and quality monitor, such as shown in FIG. 9. Beginning with block 1805, the operation includes receiving scorecards that include information on performances of agents, and in block 1810, monitoring the scorecards for low performances by the agents. In block 1815, the notification engine determines from the scorecards whether the agents have low performances. In block 1820, responsive to the scorecards indicating low performances of the agents, the agents and supervisor are provided with notification messages indicating that the agents have low performances on the scorecards. In block 1825, the agents and supervisors are provided with evaluation forms, which contain information of low performances, and in block 1830, the agents and supervisors are provided with a list of recorded interactions associated with the information of low performances. In block 1835, the notification engine provides play back capabilities to the agents and supervisors for the recorded interactions.

FIG. 19 is an exemplary display diagram that illustrates a setup of notification messages to a targeted user. A supervisor can create ad-hoc notifications. This functionality can appear through a "notify" button on a user's display device of a computing device, which when pressed, displays a notification setup screen 1905 with notification options. The notification setup screen 1905 appears with an option for the user to designate which recipients 1920 are to receive a notification message. The recipients include, but are not limited to, employees, teams, organizations, reports or other entities/groups. Once the user selects a recipient, the user can navigate to additional selector controls 1925 with which the user interacts and navigates through to the additional selector controls 1925 via working pane 1930. The additional selector controls 1925 enable the user to include a date and time on the notification messages and to filter certain information included in the notifications to the user. For example, the user may want to receive only low KPI scores on a weekly basis and a reminder before mandatory training lessons commence.

The additional selector controls 1925 further provide selections of various types of notifications, which include email, pop-up screen or text message. The controls 1925 further enable the user to create different views for the notification message. For example, if an agent has multiple notification messages, the notification messages can appear on one screen with tabs that the user can select to show other notification messages. The tabs can be arranged in a particular order as predetermined by the user. For example, the user can show notification messages from recording, quality monitor, learning component and scorecard in that particular order. The notification messages can indicate the priority of the message such as high, medium and low.

The additional selector controls 1925 further include options for popup expiration. The expiration options are: "Alert expires after X minutes", "Alert Never Expires" (Popup stays until they are discard by the target user). Other options include pop-up background color options in which users should be able to define background color for a rule from predefined color palate. The background color preferably gives users an immediate indication of the type of the alert without actually reading it. For example, users may choose the color red for adherence alerts and the color blue for schedule change alerts. Agents would be trained to give immediate attention to red popup while blue popup can wait until they finish up the current call or task. Other options that configure the notification message can include the following:

- Popup can be minimized (yes/no—default value is "yes")
- Popup stays on top (Modal) (yes/no—default value is "no")
- Popup is confidential (yes/no—default is "no")—confidential popup appears minimized on the target user screen.
- Pop-up cannot be sent while agent is on phone—selecting this option should send the pop-up message only when the user has disconnected from an existing call. Popup Delivery template—a drop down of Popup Delivery templates.
- Delivery Time—The user should be able to select a delivery date and time for the alert. If no delivery date and time is selected then the alert is sent whenever the alert rule is triggered. The notification messages can also be delivered immediately upon trigger.
- Turning off popup alerts—targeted users should not be allowed to turn off popup alerts. For example—agents cannot decide to turn off popup alerts. With that said, supervisors can still decide to turn off specific popup alerts for specific users by editing the rules they create.
- The notification engine can have the ability to queue alerts for delivery at a scheduled time and deliver them at that time.
- Message Formatting—The basic requirement is the ability to format an alert message that comprises a subject line and a body with the ability to apply a more sophisticated formatting to the message body such as bolding or coloring of word and sentences. The formatting should also include the ability to specify URL links to text and actions within the alert message. The body of the message can also contain application specific links, the ability to replay a call for example. This may require that the link contain user login information.
- Types of trigger events—Lesson Assignment, Due Date (if selected, text box is active asking number of days prior or after), Lesson Completion, Scheduled Lesson Time (if selected, text box asking number of minutes prior)

The notification engine has the ability to track responses from recipients of the notification messages. When using email notifications, a user should be able to reply to the sender and the notification engine can track any text responses as well as the time of the reply. When using pop-up or text messaging notifications, the notification engine can track whether a recipient has viewed or acknowledged the message and if the message has a reply option the notification engine can track any response entered by the user.

The notification engine can use two-way communication and a shift bidding process where questions are presented to the users with alerts. For example, a manager identifies overstaffing for today and wants to send 10 agents home early. The manager can then define a list of 100 agents and ask the notification engine to offer an early leave via the popup alerts to all agents one-by-one sequentially. The messages should have expiration of x minutes. The notification engine can manage the process automatically and stop once it has 10 positive answers from agents or it gets to the end of the list.

The notification engine should log all successful and unsuccessful notifications. It should contain a history of all emails that for whatever reason were not deliverable. It should also contain a log of all notifications still in queue and not delivered. The system should alert an administrator when the notification engine is down. To be consistent with failure alerts, a new template should be created to allow users to define when to alert and who should be alerted.

The additional selector controls 1925 further includes buttons 1935 that enable the user to add, edit delete, or cancel the notification configuration. The user edits a notification configuration by interacting and navigating through working pane 1930.

Figure 20:
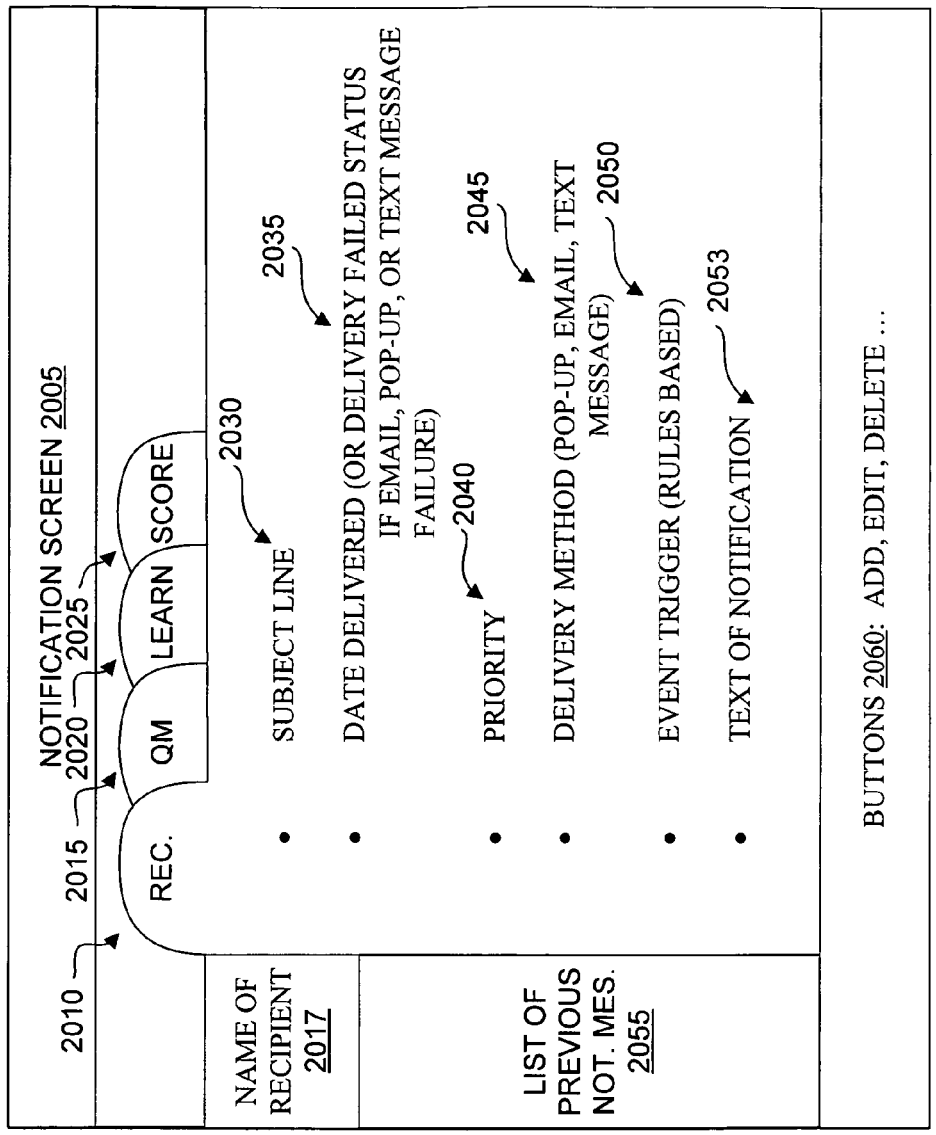
FIG. 20 is an exemplary display diagram that illustrates a notification message from a notification engine, such as shown in FIG. 3.

FIG. 20 is an exemplary display diagram that illustrates a notification message from a notification engine such as shown in FIG. 3. A notification screen 2005 appears on a user's display device responsive to an event trigger based on business rules of the integrated customer center system. The notification screen can include multiple notification messages that appears on multiple tabs 2010, 2015, 2020, 2025.

Tab 2010 shows a notification message from a recording component of an integrated customer center system. Tab includes a subject line 2030, date a delivered notification message 2035, priority level of the message 2040, delivery method 2045, the event that triggers the notification message 2005, and text of the notification 2053, among others. The notification screen 2005 further includes a name of the recipient 2017 on the left pane of the notification message 2005. The left pane further includes a section 2055 that lists previous notification messages sorted first by priority, then by date. The bottom pane includes buttons 2060 that the user can select to add, edit or delete the selected notification message from the notification screen 2005.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variations are within the scope of this disclosure, as determined by the appended claims when interpreted in accordance with the breadth to which they are fairly and legally entitled.

We claim:

1. A notification process for optimizing operations at a customer center through an integrated process having interfaced components, the method comprising the steps of:
   capturing agent-customer interactions at a recording device of a quality monitoring component executing on a computing device within the customer center in accordance with predefined business rules;
   applying an analytics function executing on the computing device within the customer center to the agent-customer interactions, the analytics function:
      performing speech recognition to convert recorded agent-customer interactions into a searchable repository;
      retrieving the agent-customer interactions from the searchable repository and determining patterns and trends within the agent-customer interactions;
      applying a weight to the patterns to determine if predetermined ones of the patterns are directed to a same customer intent; and
      automatically scoring the agent-customer interactions in accordance with the patterns, weights and trends;
   monitoring, at the quality monitoring component, scorecards for low performance of the agents, the scorecards being based on the scoring of the agent-customer interactions;
   responsive to the monitoring, determining, at the quality monitoring component, whether the scorecards indicate low performance of the agents;
   responsive to the determining, providing, by a notification engine within an administration component executing on the computing device within the customer center that interfaces with the quality monitoring component, a user notification message that notifies a supervisor and at least one agent that indications of a low performance appeared on the scorecards, wherein the notification engine further determines recorded interactions that are associated with the indications of low performance, and the user notification message includes the determined recorded interactions associated with the indications of the low performance;
   modifying, by a scheduler that interfaces with the administration component, a schedule of the at least one agent and providing a training activity at a workstation computer for the at least one agent, the training activity being targeted to address the scorecards indicative of low performance of the at least one agent; and
   providing the user notification message to notify the supervisor and the at least one agent that the training activity has been included into the schedule.

2. The notification process as defined in claim 1, wherein the user notification messages include a pop-up screen or a text message.

3. The notification process as defined in claim 1, further comprising determining whether the at least one identified agent has completed the training activity.

4. The notification process as defined in claim 3, wherein determining whether the at least one identified agent has completed the training activity is achieved by receiving a lesson log that includes information about whether the at least one identified agent has completed the training activity.

5. The notification process as defined in claim 4, further comprising sending reminder to the at least one identified agent before the training activity is conducted.

6. The notification process as defined in claim 3, further comprising notifying the supervisor and the at least one identified agent that the at least one identified agent has completed or not completed the training activity.

7. The notification process as defined in claim 1, further comprising monitoring whether a training activity was assigned to the at least one agent.

8. The notification process as defined in claim 1, further comprising notifying the at least one agent or the supervisor that the training activity has been assigned to the at least one agent.

9. The notification process as defined in claim 1, further comprising: providing a test that is given to the at least one agent to determine competency in the area associated with the training activity; receiving a test score of the test; and notifying the supervisor or at least one agent whether the at least one agent passed or failed the test.

10. The notification process as defined in claim 1, further comprising providing evaluation forms which contain the indications of low performance.

11. The notification process as defined in claim 1, further comprising providing play back capabilities for the recorded interactions.

12. The notification process as defined in claim 1, further comprising tracking responses from recipients of the user notification messages, the responses including whether the recipients have viewed the message and, if the message has a reply option, tracking any response entered by the user.

* * * * *